United States Patent
Cao et al.

(10) Patent No.: US 9,548,652 B2
(45) Date of Patent: *Jan. 17, 2017

(54) SYSTEM AND METHOD PROVIDING OVER CURRENT PROTECTION BASED ON DUTY CYCLE INFORMATION FOR POWER CONVERTER

(71) Applicant: ON-BRIGHT ELECTRONICS (SHANGHAI) CO., LTD., Shanghai (CN)

(72) Inventors: Yaming Cao, Shanghai (CN); Jinya Dong, Shanghai (CN); Yunchao Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,276

(22) Filed: Aug. 14, 2013

(65) Prior Publication Data

US 2013/0336029 A1    Dec. 19, 2013

Related U.S. Application Data

(63) Continuation of application No. 13/005,427, filed on Jan. 12, 2011, now Pat. No. 8,559,152.

(30) Foreign Application Priority Data

Dec. 8, 2010    (CN) .......................... 2010 1 0587658

(51) Int. Cl.
*H02H 5/04*    (2006.01)
*H02M 1/32*    (2007.01)
(Continued)

(52) U.S. Cl.
CPC .............. *H02M 1/32* (2013.01); *H02H 3/006* (2013.01); *H02M 3/33507* (2013.01)

(58) Field of Classification Search
CPC .. H02M 3/33507; H02M 1/32; H02M 3/3376; Y02B 70/1491; H02H 3/006
(Continued)

(56) References Cited

U.S. PATENT DOCUMENTS 3,913,002 A    10/1975    Steigerwald et al.
4,356,542 A *  10/1982    Bruckner ............ H02M 3/3378
                                                   323/267
(Continued)

FOREIGN PATENT DOCUMENTS

CN    2552047 Y    5/2003
CN    1430314 A    7/2003
(Continued)

OTHER PUBLICATIONS

Chinese Patent Office, Office Action mailed Jan. 17, 2014, in Application No. 201310306106.X.
(Continued)

*Primary Examiner* — Rajnikant Patel
(74) *Attorney, Agent, or Firm* — Jones Day

(57) ABSTRACT

System and method for protecting a power converter. The system includes a duty-cycle detection component configured to receive a modulation signal, determine a first duty cycle corresponding to a first period of the modulation signal, compare the first duty cycle with a threshold duty cycle, and generate a duty-cycle comparison signal. Additionally, the system includes a threshold generator configured to receive the duty-cycle comparison signal and generate a threshold signal corresponding to a second period of the modulation signal, the second period being after the first period, and a comparator configured to receive the threshold
(Continued)

signal and a first signal and to generate a first comparison signal. The first signal is associated with an input current for a power converter. Moreover, the system includes a pulse-width-modulation component configured to receive the first comparison signal and generate the modulation signal for adjusting the input current for the power converter.

35 Claims, 20 Drawing Sheets

(51) Int. Cl.
*H02M 3/335* (2006.01)
*H02H 3/00* (2006.01)

(58) Field of Classification Search
USPC .............................. 361/93.1, 103; 363/56.03
See application file for complete search history.

(56) References Cited

U.S. PATENT DOCUMENTS

| | | | |
|---|---|---|---|
| 4,952,853 A | 8/1990 | Archer | |
| 4,975,820 A | 12/1990 | Szepesi | |
| 5,416,689 A * | 5/1995 | Silverstein | H02M 1/32 323/284 |
| 5,550,702 A * | 8/1996 | Schmidt | H02H 9/025 361/103 |
| 5,578,908 A | 11/1996 | Persson | |
| 5,796,595 A | 8/1998 | Cross | |
| 5,867,379 A | 2/1999 | Maksimovic et al. | |
| 5,917,714 A | 6/1999 | Ogawa | |
| 6,084,783 A | 7/2000 | Rascon Martinez et al. | |
| 6,292,376 B1 | 9/2001 | Kato | |
| 6,469,917 B1 * | 10/2002 | Ben-Yaakov | H02M 1/4225 323/222 |
| 6,515,876 B2 * | 2/2003 | Koike et al. | 363/21.16 |
| 6,611,439 B1 | 8/2003 | Yang et al. | |
| 6,714,425 B2 | 3/2004 | Yamada et al. | |
| 6,839,247 B1 | 1/2005 | Yang et al. | |
| 6,842,350 B2 | 1/2005 | Yamada et al. | |
| 6,903,536 B2 | 6/2005 | Yang | |
| 6,914,789 B2 | 7/2005 | Kinoshita et al. | |
| 6,947,298 B2 | 9/2005 | Uchida | |
| 6,954,367 B2 | 10/2005 | Yang et al. | |
| 7,027,313 B2 | 4/2006 | Amei | |
| 7,061,225 B2 | 6/2006 | Yang et al. | |
| 7,099,164 B2 | 8/2006 | Zhu et al. | |
| 7,149,098 B1 | 12/2006 | Chen | |
| 7,362,592 B2 | 4/2008 | Yang et al. | |
| 7,362,593 B2 | 4/2008 | Yang et al. | |
| 7,391,630 B2 | 6/2008 | Acatrinei | |
| 7,394,634 B2 | 7/2008 | Fang et al. | |
| 7,679,938 B2 * | 3/2010 | Ye | H02M 3/33507 363/21.12 |
| 7,684,220 B2 | 3/2010 | Fang et al. | |
| 7,738,227 B2 | 6/2010 | Fang et al. | |
| 7,746,615 B2 | 6/2010 | Zhu et al. | |
| 7,759,891 B2 * | 7/2010 | Serizawa | H02H 5/044 318/434 |
| 7,778,049 B2 * | 8/2010 | Morota | H02M 3/33507 363/21.12 |
| 7,791,903 B2 | 9/2010 | Zhang et al. | |
| 8,004,112 B2 | 8/2011 | Koga et al. | |
| 8,018,745 B2 * | 9/2011 | Fang | H02H 7/12 361/93.2 |
| 8,098,502 B2 | 1/2012 | Mao et al. | |
| 8,102,676 B2 | 1/2012 | Huyhn et al. | |
| 8,416,596 B2 | 4/2013 | Huang | |
| 8,482,946 B2 | 7/2013 | Fang et al. | |
| 8,488,342 B2 | 7/2013 | Zhang et al. | |
| 8,559,152 B2 | 10/2013 | Cao et al. | |
| 8,680,884 B2 * | 3/2014 | Chobot | G01R 31/40 323/271 |
| 8,824,173 B2 | 9/2014 | Fang et al. | |
| 8,917,527 B2 | 12/2014 | Fang et al. | |
| 9,088,218 B2 | 7/2015 | Zhang et al. | |
| 9,401,648 B2 | 7/2016 | Li | |
| 2002/0131279 A1 | 9/2002 | Tang | |
| 2003/0099119 A1 | 5/2003 | Yamada et al. | |
| 2003/0156433 A1 | 8/2003 | Gong et al. | |
| 2003/0174520 A1 | 9/2003 | Bimbaud | |
| 2004/0201369 A1 | 10/2004 | Perrier et al. | |
| 2004/0218405 A1 | 11/2004 | Yamada et al. | |
| 2005/0036342 A1 | 2/2005 | Uchida | |
| 2005/0099164 A1 | 5/2005 | Yang | |
| 2006/0055433 A1 | 3/2006 | Yang et al. | |
| 2006/0291258 A1 * | 12/2006 | Zhu | H02M 3/33507 363/21.12 |
| 2008/0198638 A1 | 8/2008 | Reinberger et al. | |
| 2008/0257397 A1 | 10/2008 | Glaser et al. | |
| 2008/0298099 A1 | 12/2008 | Huang et al. | |
| 2008/0309380 A1 | 12/2008 | Yang et al. | |
| 2008/0316781 A1 | 12/2008 | Liu | |
| 2009/0021233 A1 | 1/2009 | Hsu | |
| 2009/0219070 A1 * | 9/2009 | Zhang | H02M 3/3376 327/162 |
| 2010/0253250 A1 | 10/2010 | Marvelly et al. | |
| 2011/0101953 A1 | 5/2011 | Cheng et al. | |
| 2011/0110126 A1 | 5/2011 | Morrish | |
| 2012/0008352 A1 | 1/2012 | Huang et al. | |
| 2012/0075891 A1 | 3/2012 | Zhang et al. | |
| 2012/0147630 A1 | 6/2012 | Cao et al. | |
| 2012/0194227 A1 | 8/2012 | Lin et al. | |
| 2012/0224397 A1 | 9/2012 | Yeh | |
| 2012/0281438 A1 | 11/2012 | Fang et al. | |
| 2013/0003421 A1 | 1/2013 | Fang | |
| 2013/0100715 A1 | 4/2013 | Lin et al. | |
| 2013/0135775 A1 | 5/2013 | Yao et al. | |
| 2013/0258723 A1 | 10/2013 | Fang et al. | |
| 2013/0294121 A1 | 11/2013 | Fang et al. | |
| 2014/0016366 A1 | 1/2014 | Su | |
| 2014/0029315 A1 | 1/2014 | Zhang et al. | |
| 2015/0023069 A1 | 1/2015 | Zhu et al. | |
| 2015/0180328 A1 | 6/2015 | Yao et al. | |
| 2015/0303787 A1 | 10/2015 | Zhai et al. | |
| 2015/0303898 A1 | 10/2015 | Zhai et al. | |
| 2015/0340952 A1 | 11/2015 | Manohar et al. | |
| 2015/0340957 A1 | 11/2015 | Fang et al. | |
| 2015/0357912 A1 | 12/2015 | Perreault et al. | |
| 2016/0226239 A1 | 8/2016 | Yang et al. | |

FOREIGN PATENT DOCUMENTS

| | | |
|---|---|---|
| CN | 2567850 Y | 8/2003 |
| CN | 1448005 A | 10/2003 |
| CN | 1459903 A | 12/2003 |
| CN | 1497827 A | 5/2004 |
| CN | 1815838 A | 8/2006 |
| CN | 1917322 A | 2/2007 |
| CN | 101295872 A | 10/2008 |
| CN | 101340149 A | 1/2009 |
| CN | 101499713 A | 8/2009 |
| CN | 101552570 | 10/2009 |
| CN | 100559678 C | 11/2009 |
| CN | 101662223 A | 3/2010 |
| CN | 101295872 B | 4/2010 |
| CN | 201477463 U | 5/2010 |
| CN | 101924536 A | 12/2010 |
| CN | 101964647 A | 2/2011 |
| CN | 101997412 A | 3/2011 |
| CN | 202009514 U | 10/2011 |
| CN | 102364990 A | 2/2012 |
| CN | 102412727 A | 4/2012 |
| CN | 102487246 A | 6/2012 |
| CN | 102545567 A | 7/2012 |
| CN | 102624237 A | 8/2012 |
| CN | 102638169 A | 8/2012 |
| CN | 102651613 A | 8/2012 |
| CN | 102761255 A | 10/2012 |
| CN | 102790531 A | 11/2012 |
| CN | 102801300 A | 11/2012 |
| CN | 103078489 | 5/2013 |

(56) References Cited

FOREIGN PATENT DOCUMENTS

| | | |
|---|---|---|
| CN | 103166198 | 6/2013 |
| CN | 103167665 A | 6/2013 |
| CN | 103401424 A | 11/2013 |
| CN | 103781256 | 5/2014 |
| CN | 103781257 | 5/2014 |
| CN | 203747681 | 7/2014 |
| CN | 104853493 A | 8/2015 |
| CN | 104967328 A | 10/2015 |
| EP | 0871328 B1 | 8/2003 |
| EP | 1317052 B1 | 10/2006 |
| JP | 2003-333839 A | 11/2003 |
| JP | 2006-237519 A | 9/2006 |
| JP | 2006-237619 A | 9/2006 |
| JP | 4064296 | 3/2008 |
| JP | 2009-36750 A | 2/2009 |
| TW | 200929824 | 7/2009 |
| TW | M400069 | 3/2011 |
| TW | 201117670 | 5/2011 |
| TW | 201218860 | 5/2012 |
| TW | 201225495 | 6/2012 |
| TW | 201241591 | 10/2012 |
| TW | 201325304 | 6/2013 |
| TW | I403875 | 8/2013 |
| TW | I434500 | 4/2014 |
| TW | 201429132 | 7/2014 |
| TW | I458232 | 10/2014 |
| TW | 201541845 | 11/2015 |
| WO | WO 2012/147453 | 11/2012 |

OTHER PUBLICATIONS

Chinese Patent Office, Office Action mailed Jan. 3, 2014, in Application No. 201010587658.9.
Taiwan Intellectual Property Office, Office Action mailed Mar. 13, 2014, in Application No. 100101960.
Chinese Patent Office, Office Action mailed Aug. 1, 2014, in Application No. 201310015152.4.
Taiwan Intellectual Property Office, Office Action mailed May 5, 2015, in Application No. 102131370.
United Stated Patent and Trademark, Office Action mailed May 14, 2015, in U.S. Appl. No. 13/900,430.
United Stated Patent and Trademark, Office Action mailed Jun. 17, 2015, in U.S. Appl. No. 13/749,516.
Chinese Patent Office, Office Action mailed Jan. 25, 2016, in Application No. 201410157557.6.
United Stated Patent and Trademark, Notice of Allowance mailed Mar. 16, 2016, in U.S. Appl. No. 13/749,516.
United Stated Patent and Trademark, Notice of Allowance mailed Mar. 21, 2016, in U.S. Appl. No. 13/900,430.
United Stated Patent and Trademark, Notice of Allowance mailed Feb. 23, 2016, in U.S. Appl. No. 14/334,553.
Chinese Patent Office, Office Action mailed Nov. 26, 2015, in Application No. 201410134395.4.
Chinese Patent Office, Office Action mailed Dec. 4, 2015, in Application No. 201410198140.4.
United Stated Patent and Trademark, Notice of Allowance mailed Nov. 13, 2015, in U.S. Appl. No. 13/749,516.
United Stated Patent and Trademark, Notice of Allowance mailed Nov. 6, 2015, in U.S. Appl. No. 13/900,430.
United Stated Patent and Trademark, Notice of Allowance mailed Jan. 20, 2016, in U.S. Appl. No. 14/334,553.
United Stated Patent and Trademark, Office Action mailed Oct. 30, 2015, in U.S. Appl. No. 13/969,281.
United Stated Patent and Trademark, Office Action mailed Jan. 5, 2016, in U.S. Appl. No. 14/272,323.
Taiwan Intellectual Property Office, Office Action mailed May 18, 2016, in Application No. 103121063.
Taiwan Intellectual Property Office, Office Action mailed May 24, 2016, in Application No. 104110694.
Taiwan Intellectual Property Office, Office Action mailed May 23, 2016, in Application No. 104132444.
Taiwan Intellectual Property Office, Approval Report mailed May 26, 2016, in Application No. 104125785.
Taiwan Intellectual Property Office, Office Action mailed Jul. 29, 2016, in Application No. 105106390.
United Stated Patent and Trademark, Notice of Allowance mailed Jun. 24, 2016, in U.S. Appl. No. 13/749,516.
United Stated Patent and Trademark, Notice of Allowance mailed Jul. 11, 2016, in U.S. Appl. No. 13/900,430.
United Stated Patent and Trademark, Notice of Allowance mailed Jul. 14, 2016, in U.S. Appl. No. 14/272,323.
United Stated Patent and Trademark, Notice of Allowance mailed Jul. 27, 2016, in U.S. Appl. No. 14/639,607.
United Stated Patent and Trademark, Notice of Allowance mailed May 26, 2016, in U.S. Appl. No. 14/334,553.
United Stated Patent and Trademark, Office Action mailed May 24, 2016, in U.S. Appl. No. 13/969,281.
United Stated Patent and Trademark, Office Action mailed Jul. 12, 2016, in U.S. Appl. No. 14/753,079.
Chinese Patent Office, Office Action mailed Aug. 17, 2016, in Application No. 201510053255.9.
Chinese Patent Office, Office Action mailed Nov. 2, 2016, in Application No. 201510249026.4.
United Stated Patent and Trademark, Notice of Allowance mailed Sep. 14, 2016, in U.S. Appl. No. 13/749,516.
United States Patent and Trademark, Notice of Allowance mailed Sep. 28, 2016, in U.S. Appl. No. 13/900,430.
United States Patent and Trademark, Notice of Allowance mailed Sep. 12, 2016, in U.S. Appl. No. 14/272,323.
United States Patent and Trademark, Notice of Allowance mailed Sep. 29, 2016, in U.S. Appl. No. 14/639,607.
United States Patent and Trademark, Notice of Allowance mailed Sep. 9, 2016, in U.S. Appl. No. 14/334,553.
United States Patent and Trademark, Notice of Allowance mailed Oct. 12, 2016, in U.S. Appl. No. 14/817,081.
United States Patent and Trademark, Notice of Allowance mailed Nov. 22, 2016, in U.S. Appl. No. 13/969,281.

* cited by examiner

US 9,548,652 B2

SYSTEM AND METHOD PROVIDING OVER CURRENT PROTECTION BASED ON DUTY CYCLE INFORMATION FOR POWER CONVERTER

1. CROSS-REFERENCES TO RELATED APPLICATIONS

This application is a continuation of U.S. patent application Ser. No. 13/005,427, filed Jan. 12, 2011, which claims priority to Chinese Patent Application No. 201010587658.9, filed Dec. 8, 2010, both applications being commonly assigned and incorporated by reference herein for all purposes.

Additionally, this application is related to U.S. patent application Ser. Nos. 11/213,657, 12/125,033, 11/752,926, and 12/690,808, commonly assigned, incorporated by reference herein for all purposes.

2. BACKGROUND OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often use pulse-width-modulated (PWM) or pulse-frequency-modulated mechanisms. These mechanisms are usually implemented with a switch-mode controller including various protection components. These components can provide over-voltage protection, over-temperature protection, over-current protection (OCP), and over-power protection (OPP). These protections can often prevent the power converters and connected circuitries from suffering permanent damage.

For example, a power converter includes a power switch and transformer winding that is in series with the power switch. The current flowing through the power switch and transformer winding may be limited by an OCP system. If the OCP system is not effective, the current can reach a level at which damage to the power switch is imminent due to excessive current and voltage stress at switching or thermal run-away during operation. For example, this current level can be reached when the output short circuit or over loading occurs. Consequently, the rectifier components on the transformer secondary side are subject to permanent damage due to excessive voltage and current stress in many offline flyback converters. Hence an effective OCP system is important for a reliable switch-mode converter.

FIG. 1 is a simplified conventional switch-mode converter with over-current protection. A switch-mode converter 100 includes an OCP comparator 110, a PWM controller component 120, a gate driver 130, a power switch 140, resistors 150, 152, 154, and 156, and a primary winding 160. The OCP comparator 110, the PWM controller component 120, and the gate driver 130 are parts of a chip 180 for PWM control.

For example, the PWM controller component 120 generates a PWM signal 122, which is received by the gate driver 130. In yet another example, the OCP comparator 110 receives and compares an over-current threshold signal 112 (e.g., $V_{th\_oc}$) and a current sensing signal 114 (e.g., $V_{cs}$), and sends an over-current control signal 116 to the PWM controller component 120. When the current of the primary winding is greater than a limiting level, the PWM controller component 120 turns off the power switch 140 and shuts down the switch-mode power converter 100.

For switch-mode converter, a cycle-by-cycle or pulse-by-pulse control mechanism is often used for OCP. For example, the cycle-by-cycle control scheme limits the maximum current and thus the maximum power delivered by the switch-mode converter. This limitation on maximum power can protect the power converter from thermal run-away. Some conventional OCP systems use an adjustable OCP threshold value based on line input voltage, but the actual limitation on maximum current and thus maximum power is not always constant over a wide range of line input voltage. Other conventional OCP systems use additional resistors 152 and 154 that are external to the chip 180 and inserted between $V_{in}$ and the resistor 150 as shown in FIG. 1. But the resistor 152 consumes significant power, which often is undesirable for meeting stringent requirements on low standby power. For example, the resistor 152 of 2 MΩ can dissipate about 70 mW with input AC voltage of 264 volts.

As shown in FIG. 1, the current limit is expressed as follows:

$$I_{Limit} = \frac{V_{in}}{L_p} \times t_{on} = \frac{V_{th\_oc}}{R_s} \qquad \text{(Equation 1)}$$

where $I_{Limit}$ represents the current limit. For example, the current limit is the current threshold for triggering over-current protection. Additionally, $V_{in}$ is the line input voltage at node 190, and $V_{th\_oc}$ is the voltage level at an input terminal 112 of the OCP comparator 110. $R_s$ is the resistance of the resistor 150, and $L_p$ is the inductance of the primary winding 160. Moreover, $t_{on}$ represents on time of the power switch 140 for each cycle. Accordingly, the maximum energy $\epsilon$ stored in the primary winding 160 is $$\epsilon = \tfrac{1}{2} \times L_p \times I_{Limit}^2 = PT \qquad \text{(Equation 2)}$$

where T represents the clock period, and P represents the maximum power. So the maximum power P can be expressed as follows:

$$P = \frac{L_p \times I_{Limit}^2}{2T} = \frac{V_{in} \times t_{on}^2}{2 \times L_p \times T} \qquad \text{(Equation 3)}$$

Therefore the power can be limited by controlling the current limit $I_{Limit}$. But Equation 3 does not take into account the "delay to output" that includes the propagation delay through a current sense path to the power switch 140. For example, the propagation delay includes propagation delays through the OCP comparator 110, the PWM controller component 120, the gate driver 130, and the response delay of turning off of the power switch 140. During the "delay to output," the power switch 140 remains on, and the input current through the switch 140 keeps ramping up despite the current has already reached the threshold level of the OCP comparator 110. The extra current ramping amplitude, ΔI, due the "delay to output" is proportional to the line input voltage $V_{in}$ as follows:

$$\Delta I = \frac{V_{in}}{L_p} \times T_{delay} \quad \text{(Equation 4)}$$

where $T_{delay}$ represents the "delay to output." FIG. 2 is a simplified diagram showing conventional relationship between extra current ramping amplitude and line input voltage. As shown in FIG. 2, the actual maximum current $I_{PEAK1}$ that corresponds to higher $V_{in}$ is larger than the actual maximum current $I_{PEAK2}$ that corresponds to lower $V_{in}$. Accordingly, the actual maximum power is not constant over a wide range of line input voltage. Hence the actual maximum power is expressed as follows:

$$P = \frac{L_p \times (I_{Limit} + \Delta I)^2}{2T} = \frac{V_{in} \times (t_{on} + T_{delay})^2}{2 \times L_p \times T} \quad \text{(Equation 5)}$$

For example, $T_{delay}$ depends on internal delays, gate charges, and circuitry related to the gate driver 130. In another example, for the predetermined switch-mode converter 100, $T_{delay}$ is constant, and hence the actual maximum power depends on the line input voltage. To compensate for variations of the actual maximum power, the threshold for over-current protection should be adjusted based on the line input voltage.

FIG. 3 is a simplified diagram showing conventional relationship between current threshold and line input voltage. The line input voltage $V_{in2}$ is lower than the line input voltage $V_{in1}$, and the current threshold $I_{th\_oc\_vin2}$ for $V_{in2}$ is larger than $I_{th\_oc\_vin1}$ for $V_{in1}$ as shown in FIG. 3. The current threshold decreases with increasing line input voltage $V_{in}$. At the current threshold, the over-current protection is triggered. The resulting maximum current $I_{PEAK1}$ for higher $V_{in}$ is the same as the resulting maximum current $I_{PEAK2}$ for lower $V_{in}$.

For example, the current threshold has the following relationship with the line input voltage:

$$I_{th\_oc} \approx I_{th\_oc}(V_{in1}) - \frac{V_{in} - V_{in1}}{L_p} T_{delay} \quad \text{(Equation 6)}$$

where $I_{th\_oc}$ is the current threshold, $V_{in}$ is the line input voltage, $L_p$ is the inductance of the primary winding, and $T_{delay}$ is the "delay to output." Additionally, $I_{th\_oc}(V_{in1})$ is the current threshold that is predetermined for the line input voltage $V_{in1}$. For example, $V_{in1}$ is the minimum line input voltage. In another example, the current is sensed that flows through the power switch and the primary winding. If the sensed current reaches $I_{th\_oc}$, the PWM controller component sends a signal to turn off the power switch. After "delay to output," the power switch is turned off.

In Equation 6, the second term $$\frac{V_{in} - V_{in1}}{L_p} T_{delay}$$

represents a threshold offset to compensate for the effects of "delay to output." FIG. 4 is a simplified diagram showing conventional relationship between threshold offset and line input voltage. As shown in FIG. 4, the term $$\frac{T_{delay}}{L_p}$$

is the slope that depends on the "delay to output" and the inductance of primary winding. As shown in FIG. 4, the current threshold decreases with increasing line input voltage.

There are at least two conventional approaches to implement the current threshold as a function of line input voltage according to FIG. 4. In one example, the line input voltage is sensed to generate an offset DC voltage proportional to line input voltage in order to compensate for the effects of "delay to output" as shown in Equation 6.

In another example, the line input voltage is sensed based on the maximum width of PWM signal. The PWM signal is applied to the gate of a power switch in series to the primary winding of a power converter. FIG. 5 is a simplified diagram showing conventional relationship between PWM signal maximum width and line input voltage. As shown in FIG. 5, the maximum current is constant with respect to line input voltage, and the maximum width of PWM signal varies with line input voltage. The maximum current $I_{PEAK1}$ equals the maximum current $I_{PEAK2}$. The maximum current $I_{PEAK1}$ corresponds to a higher line input voltage and a PWM signal 510, and the maximum current $I_{PEAK2}$ corresponds to a lower line input voltage and a PWM signal 520. As shown in FIG. 5, the maximum width for the PWM signal 510 is narrower for higher line input voltage, and the maximum width for the PWM signal 520 is wider for lower line input voltage. The line input voltage is represented by the maximum width of PWM signal if the maximum current is constant with respect to line input voltage. Accordingly, the maximum width of PWM signal can be used to determine the threshold offset to compensate for the effects of "delay to output" as shown in Equation 6.

According to FIG. 5, the compensation can be realized by generating a current threshold, $I_{th\_oc}$, which is a function of the maximum width of PWM signal. For example, the current threshold is equal to $I_{th\_oc\_1}$ for the PWM signal 510 and $I_{th\_oc\_2}$ for the PWM signal 520. In another example, the slope of $I_{th\_oc}$, with respect to the maximum width is properly chosen to compensate for the effects of "delay to output" as shown in Equation 6. The selected slope takes into account information about power converter components that are external to the chip for PWM control. The external components may include the primary winding, a current sensing resistor and a power MOSFET.

Additionally, to achieve high efficiency, a power converter usually works in CCM mode at low line input voltage and works in DCM mode at high line input voltage. FIG. 6 shows simplified conventional current profiles for primary winding in CCM mode and DCM mode. The current profiles describe current magnitudes as functions of time. As shown in FIG. 6(*a*), the current for primary winding increases from I_L to a current limit I_p1 within a pulse width at each cycle in DCM mode. For example, I_L is equal to zero. The energy delivered to the load at each cycle is $$\epsilon = \tfrac{1}{2} \times L_p \times (I\_p1)^2 \quad \text{(Equation 32)}$$

In contrast, as shown in FIG. 6(*b*), the current for primary winding increases from I_i2 to a current limit I_p2 within a pulse width at each cycle in CCM mode. For example, I_i2 is larger than zero. The energy delivered to the load at each cycle is $$\epsilon = \frac{1}{2} \times L_p \times [(I\_p2)^2 - (I\_i2)^2] \quad \text{(Equation 33)}$$

where the ratio of $$\frac{I\_i2}{I\_p2}$$

can vary with line input voltage. For example, the ratio increases with decreasing line input voltage. As described in Equations 32 and 33, if the two current limits I_p1 and I_p2 are equal, the amount of energy delivered to the load in DCM mode is higher than the amount of energy delivered to the load in CCM mode at each cycle.

FIG. 7 shows a simplified diagram for maximum energy delivered to load at each cycle as a conventional function of line input voltage. As a function of line input voltage, the current limit, which equals either I_p1 or I_p2, is adjusted to compensate for "delay to output" as shown in FIG. 4, but differences between Equations 32 and 33 have not been taken into account. Also, FIG. 7 does not appear to have taken into account the varying ratio of $$\frac{I\_i2}{I\_p2}.$$

Hence the maximum energy is not constant over the entire range of line input voltage. For example, as shown by a curve 1300, the maximum energy decreases significantly with decreasing line input voltage in CCM mode, even though the maximum energy appears substantially constant in the DCM mode.

In order to improve consistency of maximum energy in the CCM mode and the DCM mode, the compensation slope for the current threshold or the corresponding voltage threshold can be made different in different modes. Specifically, as shown in Equations 32 and 33, the compensation slope in the CCM mode is greater than the compensation slope in the DCM mode in magnitude.

But the maximum energy of the power converter can also be affected by other characteristics of the system. Hence it is highly desirable to improve techniques for over-current protection and over-power protection.

3. BRIEF SUMMARY OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

According to one embodiment, a system for protecting a power converter includes a duty-cycle detection component configured to receive a modulation signal, determine a first duty cycle corresponding to a first period of the modulation signal, compare the first duty cycle with a threshold duty cycle, and generate a duty-cycle comparison signal. Additionally, the system includes a threshold generator configured to receive the duty-cycle comparison signal and generate a threshold signal corresponding to a second period of the modulation signal, the second period being after the first period, and a comparator component configured to receive the threshold signal and a first signal and to generate a first comparison signal. The first signal is associated with an input current for a power converter. Moreover, the system includes a pulse-width-modulation component configured to receive the first comparison signal and generate the modulation signal for adjusting the input current for the power converter based on at least information associated with the first comparison signal. The threshold signal is associated with a threshold magnitude corresponding to the second period of the modulation signal. If the first duty cycle is determined to be smaller than the threshold duty cycle, the threshold magnitude equals a first magnitude at the beginning of the second period and changes from the first magnitude to a second magnitude within the second period. If the first duty cycle is determined to be larger than the threshold duty cycle, the threshold magnitude equals a third magnitude at the beginning of the second period, and the third magnitude is larger than the first magnitude.

According to another embodiment, a method for protecting a power converter includes receiving a modulation signal, determining a first duty cycle corresponding to a first period of the modulation signal, processing information associated with the first duty cycle and a threshold duty cycle, and generating a duty-cycle comparison signal to indicate whether the first duty cycle is larger than the threshold duty cycle or whether the first duty cycle is smaller than the threshold duty cycle. Additionally, the method includes receiving the duty-cycle comparison signal, processing information associated with the duty-cycle comparison signal, and generating a threshold signal corresponding to a second period of the modulation signal. The second period is after the first period. Moreover, the method includes receiving the threshold signal and a first signal. The first signal is associated with an input current for a power converter. Also, the method includes generating a first comparison signal based on at least information associated with the threshold signal and the first signal, receiving the first comparison signal, processing information associated with the first comparison signal, and generating the modulation signal for adjusting the input current for the power converter based on at least information associated with the first comparison signal. The threshold signal is associated with a threshold magnitude corresponding to the second period of the modulation signal. If the first duty cycle is smaller than the threshold duty cycle, the threshold magnitude equals a first magnitude at the beginning of the second period and changes from the first magnitude to a second magnitude within the second period. If the first duty cycle is larger than the threshold duty cycle, the threshold magnitude equals the third magnitude at the beginning of the second period, and the third magnitude is larger than the first magnitude.

According to yet another embodiment, a system for protecting a power converter includes a duty-cycle detection component configured to receive a modulation signal, determine a first duty cycle corresponding to a first period of the modulation signal, compare the first duty cycle with a threshold duty cycle, and generate a duty-cycle comparison signal. Additionally, the system includes a threshold generator configured to generate a threshold signal, and a comparator configured to receive the threshold signal and a first signal and generate a first comparison signal. The first signal is associated with an input current for a power converter. Moreover, the system includes a duty-cycle limiting component configured to receive the duty-cycle comparison signal and generate a duty-cycle limiting signal based on at least information associated with the duty-cycle comparison signal, and a control and modulation component configured to receive the first comparison signal and the duty-cycle limiting signal and generate the modulation signal for a second period. The second period is after the first period. The modulation signal for the second period is associated with a second duty cycle, and the duty-cycle limiting signal is associated with a duty-cycle limiting value. If the first duty cycle is smaller than the threshold duty cycle; the second duty cycle cannot exceed the duty-cycle limiting value, and if the first duty cycle is larger than the threshold duty cycle, the second duty cycle can exceed the duty-cycle limiting value.

According to yet another embodiment, a method for protecting a power converter includes receiving a modulation signal, determining a first duty cycle corresponding to a first period of the modulation signal, processing information associated with the first duty cycle with a threshold duty cycle, and generating a duty-cycle comparison signal to indicate whether the first duty cycle is larger than the threshold duty cycle or whether the first duty cycle is smaller than the threshold duty cycle. Additionally, the method includes receiving the duty-cycle comparison signal, processing information associated with the duty-cycle comparison signal, generating a duty-cycle limiting signal based on at least information associated with the duty-cycle comparison signal, generating a threshold signal, and receiving the threshold signal and a first signal. The first signal is associated with an input current for a power converter. Moreover, the method includes generating a first comparison signal based on at least information associated with the threshold signal and the first signal, receiving the first comparison signal and the duty-cycle limiting signal, processing information associated with the first comparison signal and the duty-cycle limiting signal, and generating the modulation signal for a second period based on at least information associated with the first comparison signal and the duty-cycle limiting signal. The second period is after the first period. The modulation signal for the second period is associated with a second duty cycle, and the duty-cycle limiting signal is associated with a duty-cycle limiting value. If the first duty cycle is smaller than the threshold duty cycle, the second duty cycle cannot exceed the duty-cycle limiting value, and if the first duty cycle is larger than the threshold duty cycle, the second duty cycle can exceed the duty-cycle limiting value.

According to yet another embodiment, a system for protecting a power converter includes a duty-cycle detection component configured to receive a modulation signal, determine a first duty cycle corresponding to a first period of the modulation signal, compare the first duty cycle with a first threshold duty cycle, compare the first duty cycle with a second threshold duty cycle, and generate a first duty-cycle comparison signal and a second duty-cycle comparison signal. Additionally, the system includes a threshold generator configured to receive the first duty-cycle comparison signal and generate a threshold signal corresponding to a second period of the modulation signal, and a comparator component configured to receive the threshold signal and a first signal and generate a first comparison signal. The second period is after the first period, and the first signal is associated with an input current for a power converter. Moreover, the system includes a duty-cycle limiting component configured to receive the second duty-cycle comparison signal and generate a duty-cycle limiting signal based on at least information associated with the second duty-cycle comparison signal, and a control and modulation component configured to receive the first comparison signal and the duty-cycle limiting signal and generate the modulation signal for the second period. The threshold signal is associated with a threshold magnitude corresponding to the second period of the modulation signal. If the first duty cycle is determined to be smaller than the first threshold duty cycle, the threshold magnitude equals a first magnitude at the beginning of the second period and changes from the first magnitude to a second magnitude within the second period, and if the first duty cycle is determined to be larger than the first threshold duty cycle, the threshold magnitude equals a third magnitude at the beginning of the second period, the third magnitude being larger than the first magnitude. The modulation signal for the second period is associated with a second duty cycle, and the duty-cycle limiting signal is associated with a duty-cycle limiting value. If the first duty cycle is smaller than the second threshold duty cycle; the second duty cycle cannot exceed the duty-cycle limiting value, and if the first duty cycle is larger than the second threshold duty cycle, the second duty cycle can exceed the duty-cycle limiting value.

According to yet another embodiment, a method for protecting a power converter includes receiving a modulation signal, determining a first duty cycle corresponding to a first period of the modulation signal, processing information associated with the first duty cycle with a first threshold duty cycle and a second threshold duty cycle, generating a first duty-cycle comparison signal to indicate whether the first duty cycle is larger than the first threshold duty cycle or whether the first duty cycle is smaller than the first threshold duty cycle, and generating a second duty-cycle comparison signal to indicate whether the first duty cycle is larger than the second threshold duty cycle or whether the first duty cycle is smaller than the second threshold duty cycle. Additionally, the method includes receiving the first duty-cycle comparison signal, processing information associated with the first duty-cycle comparison signal, and generating a threshold signal corresponding to a second period of the modulation signal, and receiving the threshold signal and a first signal. The second period is after the first period, and the first signal is associated with an input current for a power converter. Moreover, the method includes generating a first comparison signal based on at least information associated with the threshold signal and the first signal, receiving the second duty-cycle comparison signal, processing information associated with the second duty-cycle comparison signal, and generating a duty-cycle limiting signal based on at least information associated with the second duty-cycle comparison signal. Also, the method includes receiving the first comparison signal and the duty-cycle limiting signal, processing information associated with the first comparison signal and the duty-cycle limiting signal, and generating the modulation signal for the second period based on at least information associated with the first comparison signal and the duty-cycle limiting signal. The threshold signal is associated with a threshold magnitude corresponding to the second period of the modulation signal. If the first duty cycle is determined to be smaller than the first threshold duty cycle, the threshold magnitude equals a first magnitude at the beginning of the second period and changes from the first magnitude to a second magnitude within the second period, and if the first duty cycle is determined to be larger than the first threshold duty cycle, the threshold magnitude equals a third magnitude at the beginning of the second period, the third magnitude being larger than the first magnitude. The modulation signal for the second period is associated with a second duty cycle, and the duty-cycle limiting signal is associated with a duty-cycle limiting value. If the first duty cycle is smaller than the second threshold duty cycle; the second duty cycle cannot exceed the duty-cycle limiting value, and if the first duty cycle is larger than the second threshold duty cycle, the second duty cycle can exceed the duty-cycle limiting value.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a control system and method for over-current protection and over-power protection. Merely by way of example, the invention has been applied to a power converter. But it would be recognized that the invention has a much broader range of applicability.

Figure 8:
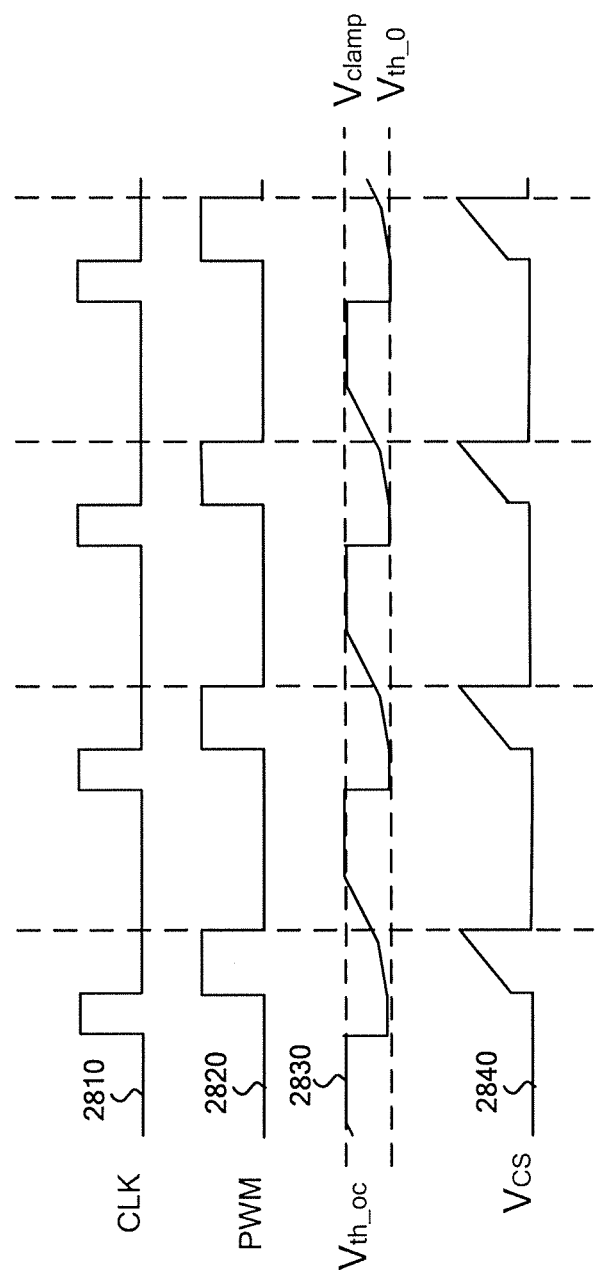
FIGS. 8 and 9 are simplified timing diagrams for a switch-mode converter corresponding to different line input voltages in the CCM mode.
Figure 9:
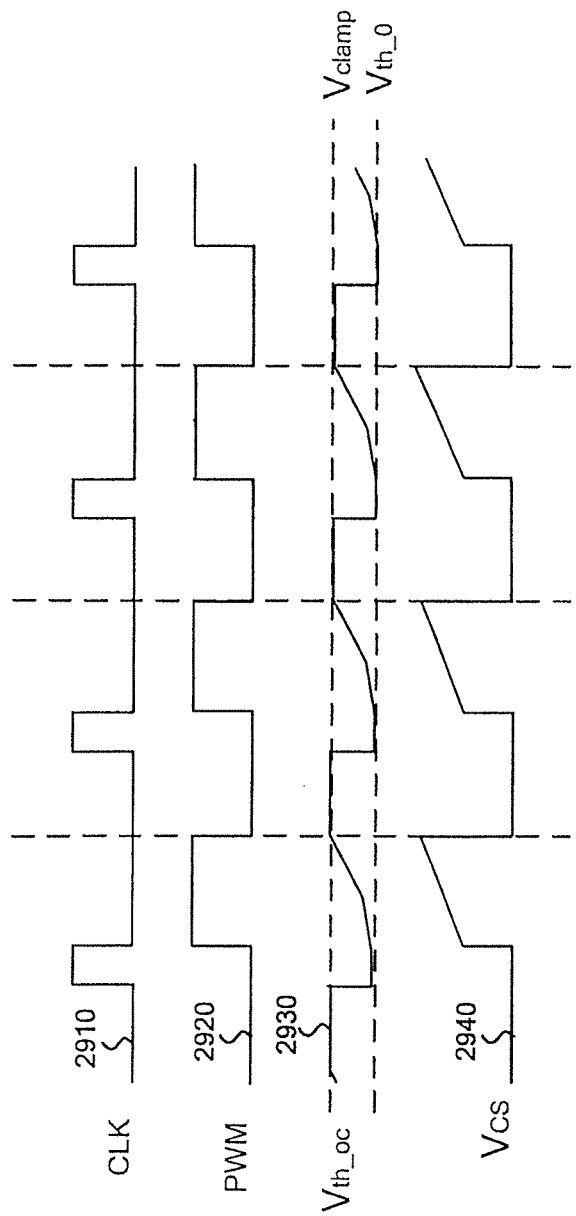

FIGS. 8 and 9 are simplified timing diagrams for a switch-mode converter corresponding to different line input voltages in the CCM mode. For example, the line input voltage for FIG. 8 is higher than the line input voltage for FIG. 9.

As shown in FIG. 8, curves 2810, 2820, 2830, and 2840 represent the timing diagrams for a clock signal, a PWM signal, an over-current threshold signal, and a current sensing signal respectively. For example, the clock signal is in sync with the PWM signal. In another example, the PWM signal is generated by a PWM controller component. In yet another example, the over-current threshold signal is received by an OCP comparator, and the current sensing signal is also received by the OCP comparator. As shown in FIG. 8, the curve 2830 indicates that the over-current threshold signal changes between a lower limit of $V_{th\_0}$ and an upper limit of $V_{clamp}$, and the slope of the timing diagram in the CCM mode is greater than the slope of the timing diagram in the DCM mode.

Similarly, as shown in FIG. 9, curves 2910, 2920, 2930, and 2940 represent the timing diagrams for the clock signal, the PWM signal, the over-current threshold signal, and the current sensing signal respectively. For example, the clock signal is in sync with the PWM signal. In another example, the PWM signal is generated by the PWM controller component. In yet another example, the over-current threshold signal is received by the OCP comparator, and the current sensing signal is also received by the OCP comparator. As shown in FIG. 9, the curve 2930 indicates that the over-current threshold signal changes between the lower limit of $V_{th\_0}$ and the upper limit of $V_{clamp}$, and the slope of the timing diagram in the CCM mode is greater than the slope of the timing diagram in the DCM mode.

Referring to FIGS. 8 and 9, the technique can improve consistency of maximum energy in the CCM mode and the DCM mode at different line input voltages, but the technique has its own limitations.

Figure 1:
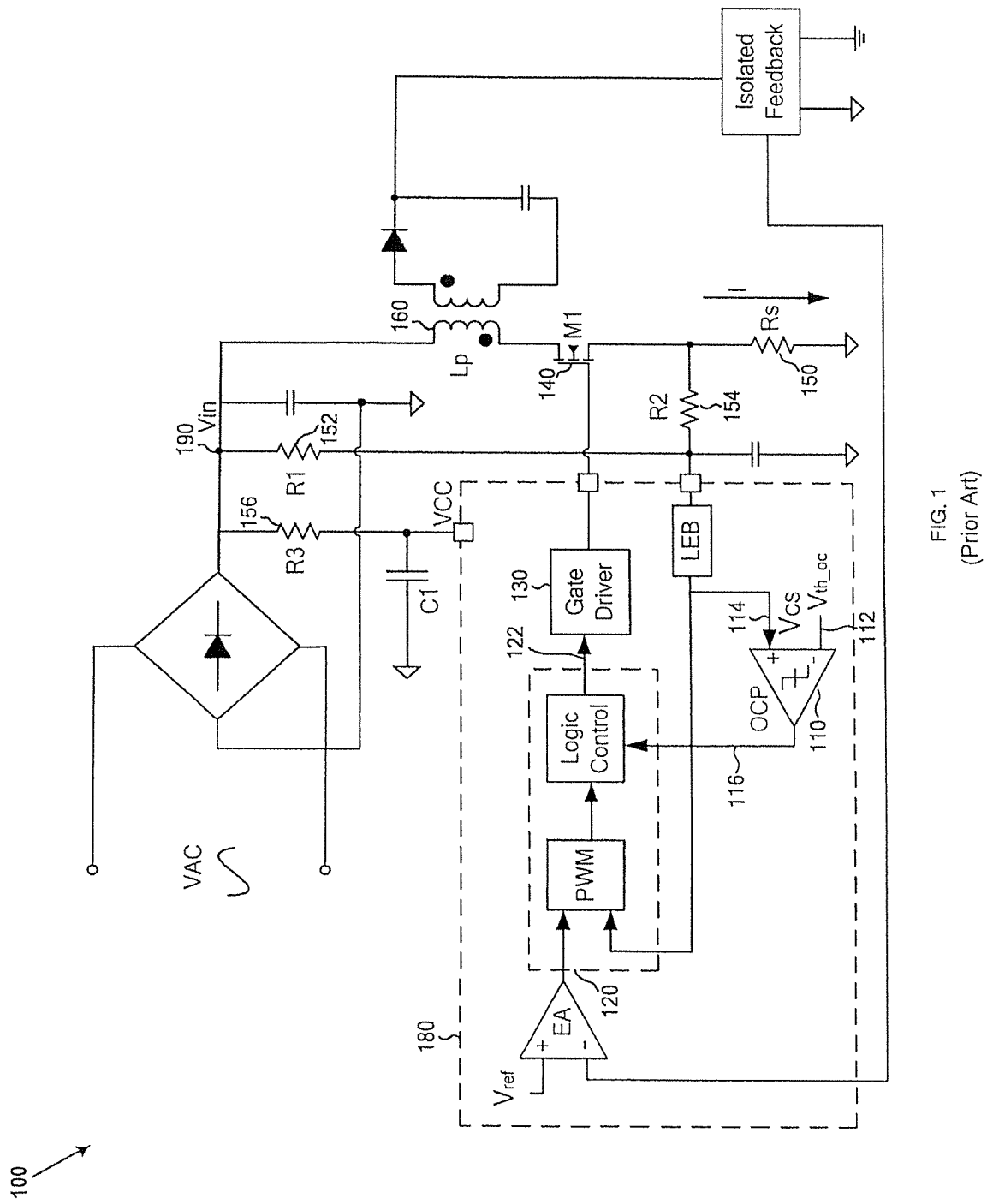
FIG. 1 is a simplified conventional switch-mode converter with over-current protection.
Figure 2:
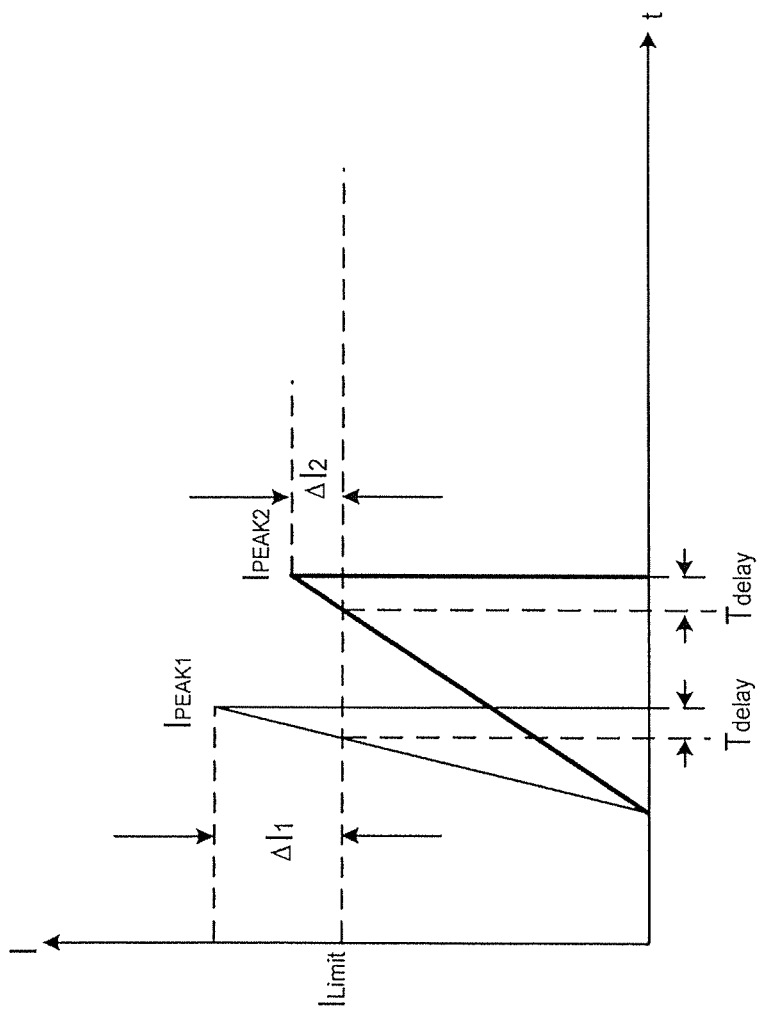
FIG. 2 is a simplified diagram showing conventional relationship between extra current ramping amplitude and line input voltage.
Figure 3:
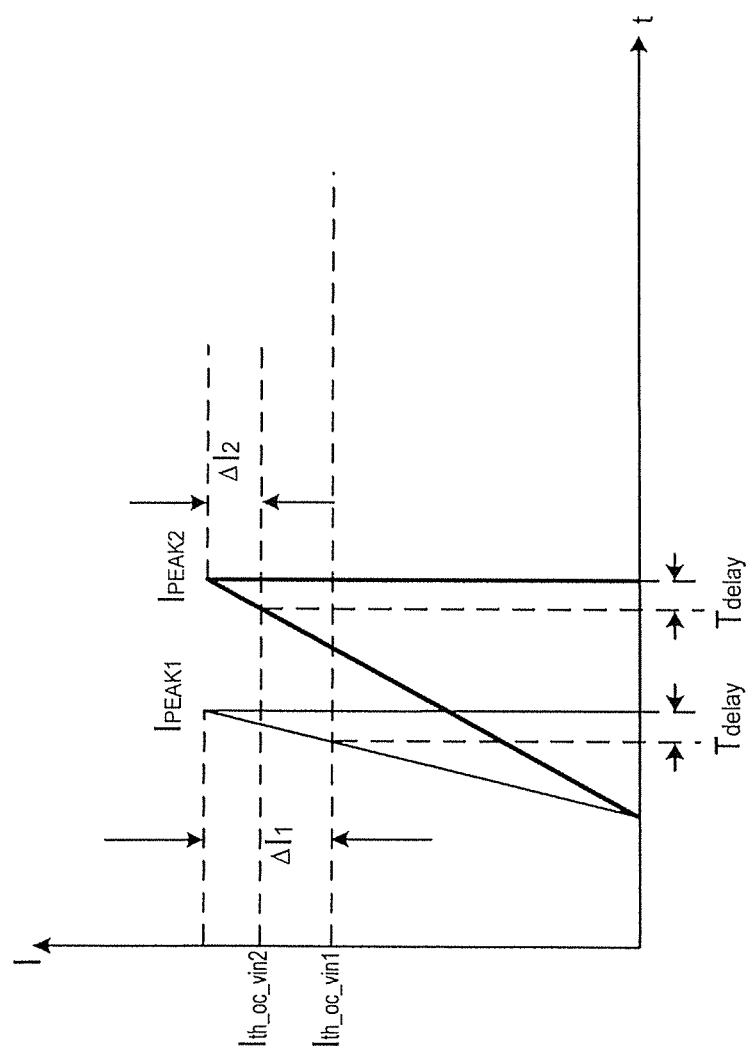
FIG. 3 is a simplified diagram showing conventional relationship between current threshold and line input voltage.
Figure 4:
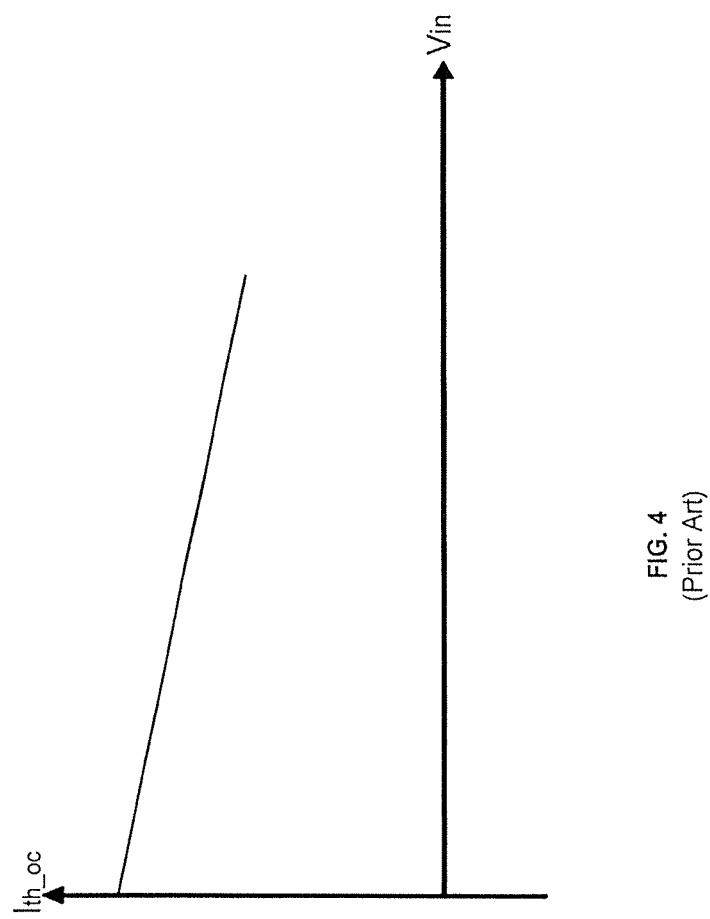
FIG. 4 is a simplified diagram showing conventional relationship between threshold offset and line input voltage.
Figure 5:
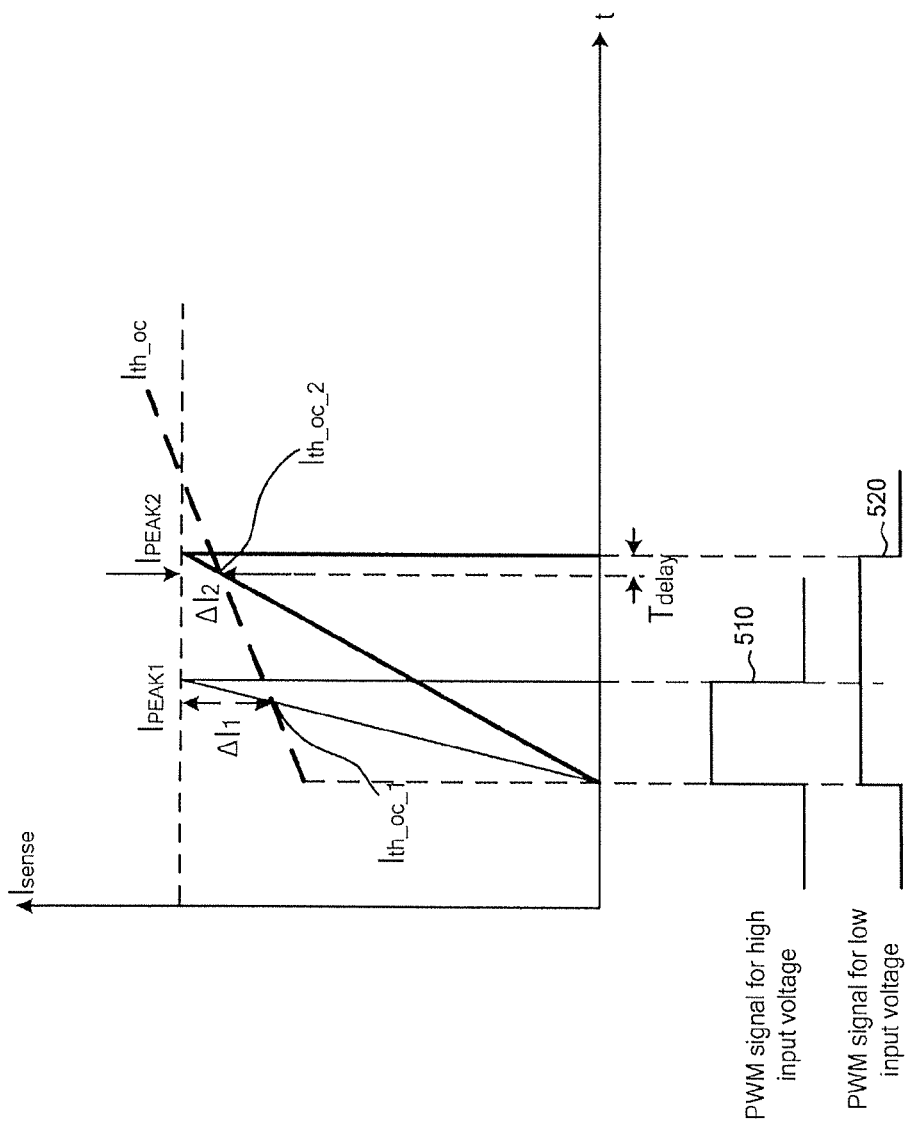
FIG. 5 is a simplified diagram showing conventional relationship between PWM signal maximum width and line input voltage.
Figure 6:
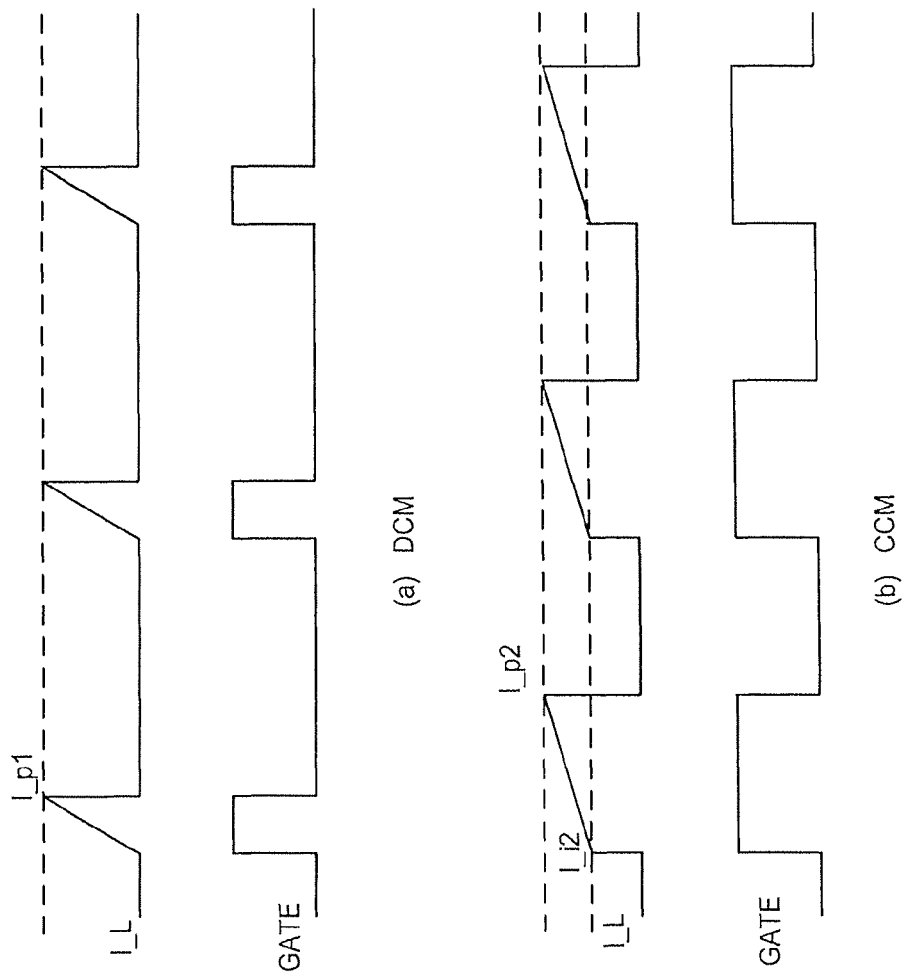
FIG. 6 shows simplified conventional current profiles for primary winding in CCM mode and DCM mode.
Figure 7:
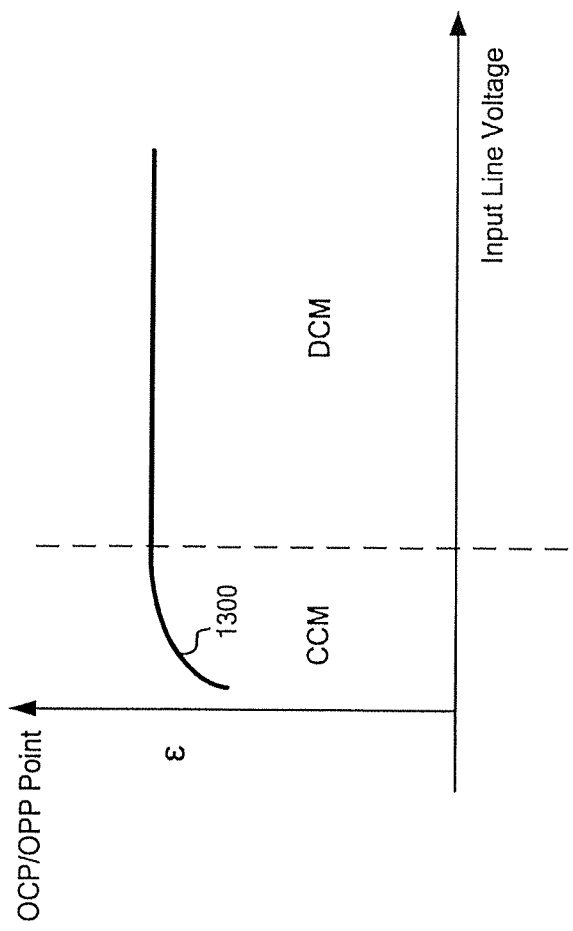
FIG. 7 shows a simplified diagram for maximum energy delivered to load at each cycle as a conventional function of line input voltage.

As shown in FIG. 1, the line input voltage $V_{in}$ at the node 190 often is not a perfect DC voltage. Instead, the line input voltage $V_{in}$ usually changes with the output loading of the system 100 and the VAC signal. The VAC signal is an AC voltage signal, which changes its magnitude with time. For the same VAC signal, the change in the line input voltage $V_{in}$ increases with the output loading of the system 100.

Figure 10:
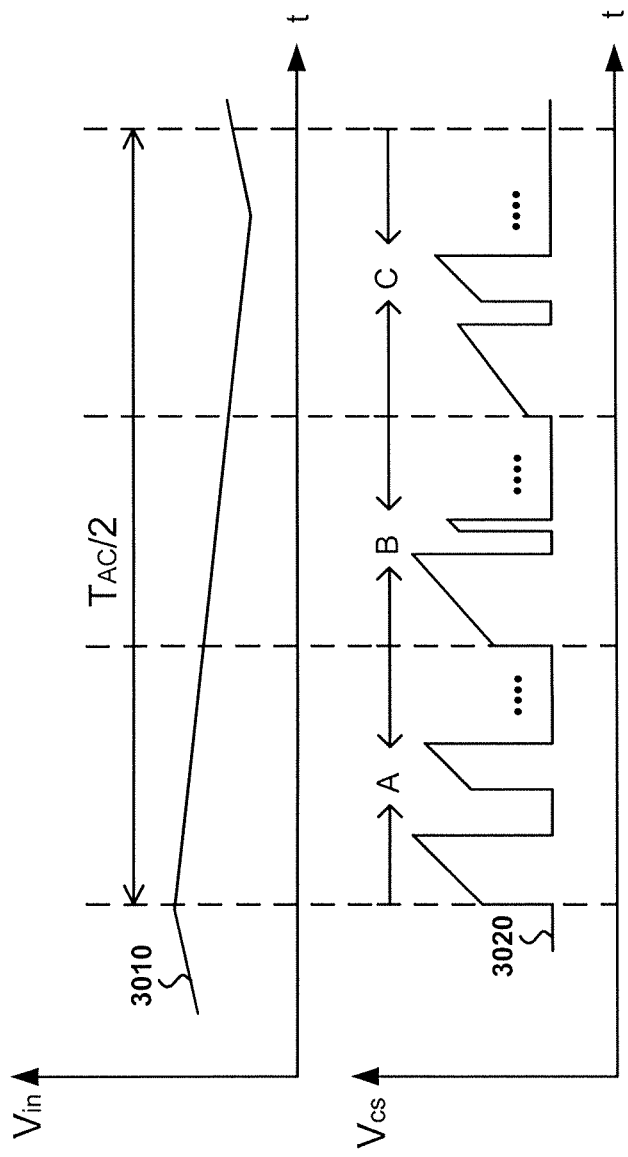
FIG. 10 is a simplified diagram showing effect of change in the line input voltage $V_{in}$ on the current sensing signal for the conventional switch-mode converter.

FIG. 10 is a simplified diagram showing effect of change in the line input voltage $V_{in}$ on the current sensing signal for the conventional switch-mode converter 100. Curves 3010 and 3020 represent the timing diagrams for the line input voltage $V_{in}$ and the current sensing signal respectively.

As shown in FIG. 10, in each of regions A, B, and C, there are two voltage pulses for the current sensing signal, one often being larger than the other. According to one embodiment, a duty cycle of a signal for a signal period is the ratio between the length of time when the signal is at a logic high level and the length of the signal period. In region A, the duty cycle of the PWM signal is relatively small, so the off-time of the PWM signal is long enough for sufficient demagnetization and effective transfer of energy to the output of the switch-mode converter 100. Subsequently, at the beginning of the next PWM period, the voltage value of the current sensing signal is lower than the corresponding voltage threshold value of $V_{th\_0}$. Hence, in this PWM period, the primary winding can effectively store energy, and the stored energy can be effectively transferred to the output of the switch-mode converter 100. Hence in region A, the maximum power actually delivered by the switch-mode converter 100 is not significantly affected by the change in the line input voltage $V_{in}$.

In region B, the duty cycle of the PWM signal is relatively large, and the off-time of the PWM signal is too short for sufficient demagnetization and effective transfer of energy to the output of the switch-mode converter 100. Subsequently, at the beginning of the next PWM period, the voltage value of the current sensing signal is higher than the corresponding voltage threshold value of $V_{th\_0}$. Hence, in this PWM period, the power switch 140 is turned off soon after being turned on, causing the primary winding not being able to effectively store energy and effectively reducing the switching frequency by half. Consequently, the input power to the primary winding is also reduced by half, and the maximum power actually delivered by the switch-mode converter 100 in region B is significantly affected by the change in the line input voltage $V_{in}$.

Similarly, in region C, the duty cycle of the PWM signal reaches the maximum duty cycle that is set by the chip 180 for PWM control. For example, the maximum duty cycle is set to 80%. Consequently, the off-time of the PWM signal is too short for sufficient demagnetization and effective transfer of energy to the output of the switch-mode converter 100. Consequently, the maximum power actually delivered by the switch-mode converter 100 in region C is significantly reduced by the change in the line input voltage $V_{in}$.

As shown in FIG. 10, regions A, B and C can repeatedly occur in different half periods of the VAC signal. For example, $T_{AC}$ represents the period of the VAC signal, which is equal to 20 ms for 220V/50 Hz AC voltage and equal to 16.67 ms for 110V/60 Hz AC voltage. In another example, regions B and C correspond to lower magnitudes of the line input voltage $V_{in}$ than region A. In yet another example, in regions A, B, and C, the effect of change in the line input voltage $V_{in}$ on the current sensing signal may be different.

As discussed above, the reduction of the effective PWM switching frequency is an important reason for the reduction of the maximum power actually delivered by the switch-mode converter 100. Hence, to restore the actual maximum power to the predetermined maximum power, it is important to correct the combination of larger voltage pulse and smaller voltage pulse. According to one embodiment, a correction is made to the smaller voltage pulse so that the power switch has sufficient on-time in each PWM period to enable effective energy storage by the primary winding.

Figure 11:
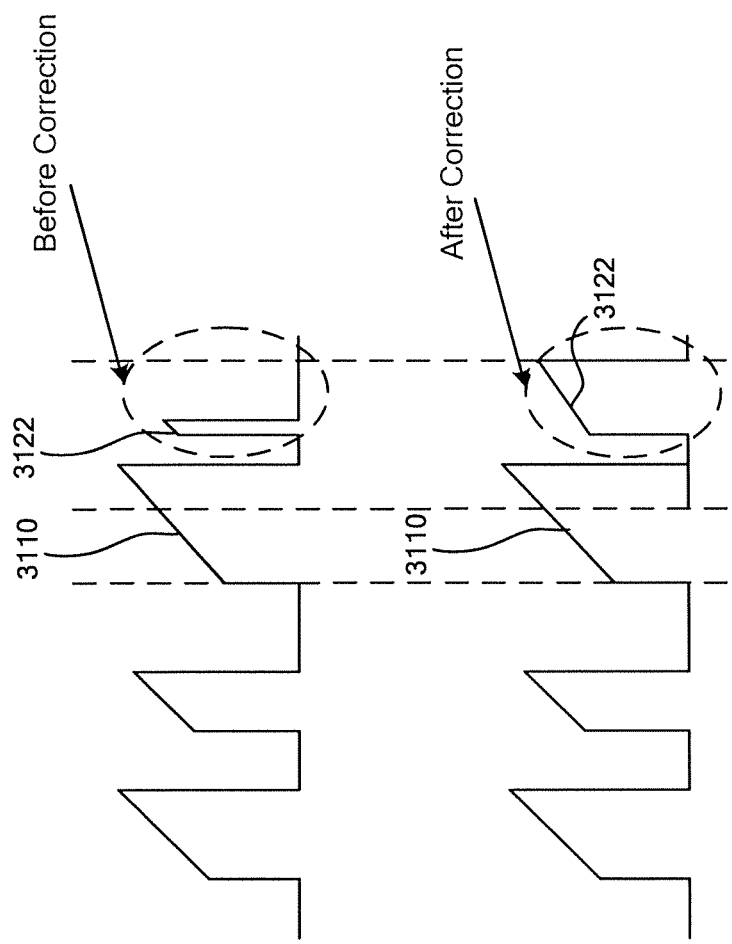
FIG. 11 is a simplified diagram showing correction to voltage pulse of the current sensing signal according to an embodiment of the present invention.

FIG. 11 is a simplified diagram showing correction to voltage pulse of the current sensing signal according to an embodiment of the present invention. This diagram is merely an example, which should not unduly limit the scope of the claims. One of ordinary skill in the art would recognize many variations, alternatives, and modifications.

As shown in FIG. 11, if the duty cycle of the PWM signal for the current PWM period (e.g., the PWM period that corresponds to a pulse 3110 in FIG. 11) is determined to be larger than a predetermined duty-cycle threshold (e.g., 60%), the voltage threshold is set, at the beginning of the next PWM period, to another threshold level (e.g., $V_{th\_a}$) that is different from the lower limit of $V_{th\_0}$, in order to correct a pulse 3120 to become a pulse 3122 according to one embodiment. For example, the threshold level (e.g., $V_{th\_a}$) is the same as the upper limit of $V_{clamp}$. In another example, the threshold level (e.g., $V_{th\_a}$) is larger than the lower limit of $V_{th\_0}$ but smaller than the upper limit of $V_{clamp}$.

In another example, such correction can modify the duty cycle of the PWM signal and prevent the power switch from being turned off soon after being turned on. In yet another example, such correction to the voltage pulse enables the primary winding of the switch-mode converter to effectively store and transfer energy. In yet another example, such correction to the voltage pulse can prevent the reduction of the effective switch frequency and the reduction of maximum power actually delivered by the switch-mode converter.

Figure 12:
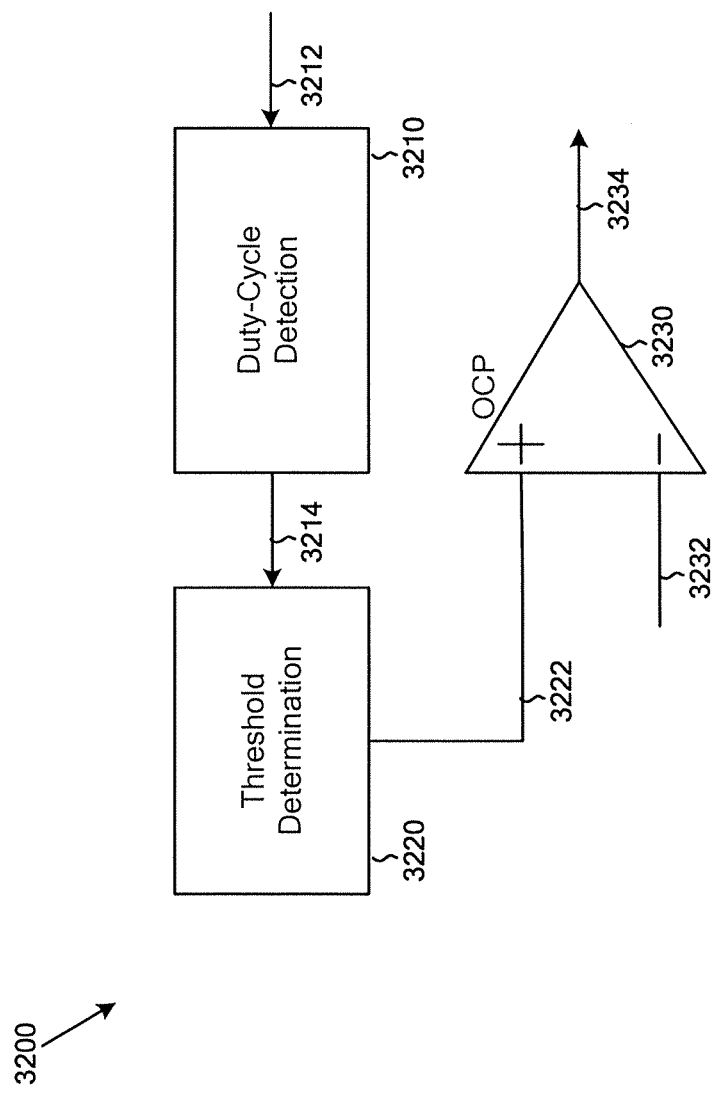
FIG. 12 is a simplified diagram showing a system for adjusting over-current threshold in response to detected duty cycle according to an embodiment of the present invention.

FIG. 12 is a simplified diagram showing a system for adjusting over-current threshold in response to detected duty cycle according to an embodiment of the present invention. This diagram is merely an example, which should not unduly limit the scope of the claims. One of ordinary skill in the art would recognize many variations, alternatives, and modifications.

As shown in FIG. 12, the system 3200 includes a duty-cycle detection component 3210, a threshold determination component 3220, and a comparator component 3230. According to one embodiment, the duty-cycle detection component 3210 receives a signal 3212 and detects the duty cycle of a signal period of the signal 3212. For example, the signal 3212 is a PWM signal. In another example, the duty-cycle detection component 3210 compares the detected duty cycle of the signal period with a predetermined duty-cycle threshold. In one embodiment, the duty-cycle threshold is 60%. In another embodiment, the duty-cycle detection component 3210 generates a signal 3214 that indicates whether the detected duty cycle of the signal period is larger than the duty-cycle threshold.

According to another embodiment, the signal 3214 is received by the threshold determination component 3220, which generates an over-current threshold signal 3222. For example, if the signal 3214 does not indicate that the detected duty cycle of the signal period is larger than the duty-cycle threshold, the over-current threshold signal 3222 is ramped from a lower level (e.g., $V_{th\_0}$) to a higher level (e.g., $V_{clamp}$) during the next signal period. In another example, if the signal 3214 indicates that the detected duty cycle of the signal period is larger than the duty-cycle threshold, the over-current threshold signal 3222 is set to another threshold level (e.g., $V_{th\_a}$) that is different from the lower level (e.g., $V_{th\_0}$) at the beginning of the next signal period. In one embodiment, the threshold level (e.g., $V_{th\_a}$) is equal to the higher level (e.g., $V_{clamp}$), and the over-current threshold signal 3222 stays constant during the signal period. In another embodiment, the threshold level (e.g., $V_{th\_a}$) is larger than the lower level (e.g., $V_{th\_0}$) but smaller than the higher level (e.g., $V_{clamp}$), and the over-current threshold signal 3222 is ramped from the threshold level (e.g., $V_{th\_a}$) to the higher level (e.g., $V_{clamp}$) during the signal period.

According to yet another embodiment, the over-current threshold signal 3222 is received by the comparator component 3230, which also receives a current-sensing signal 3232. For example, the comparator component 3230 compares the over-current threshold signal 3222 and the current-sensing signal 3232. In another example, the comparator component 3230 generates an over-current control signal 3234 that indicates whether the over-current threshold signal 3222 is larger than the current-sensing signal 3232 in magnitude.

Referring to FIG. 11, the system 3200 can implement certain correction to voltage pulse of the current sensing signal according to an embodiment of the present invention. For example, by setting the over-current threshold signal 3222 to another threshold level (e.g., $V_{th\_a}$) that is different from the lower level (e.g., $V_{th\_0}$), the power switch can be turned on long enough for the switch-mode converter to effectively store energy and transfer the stored energy to the output of the switch-mode converter. In another example, the maximum power actually delivered by the switch-mode converter is substantially maintained at the predetermined power level.

Figure 13:
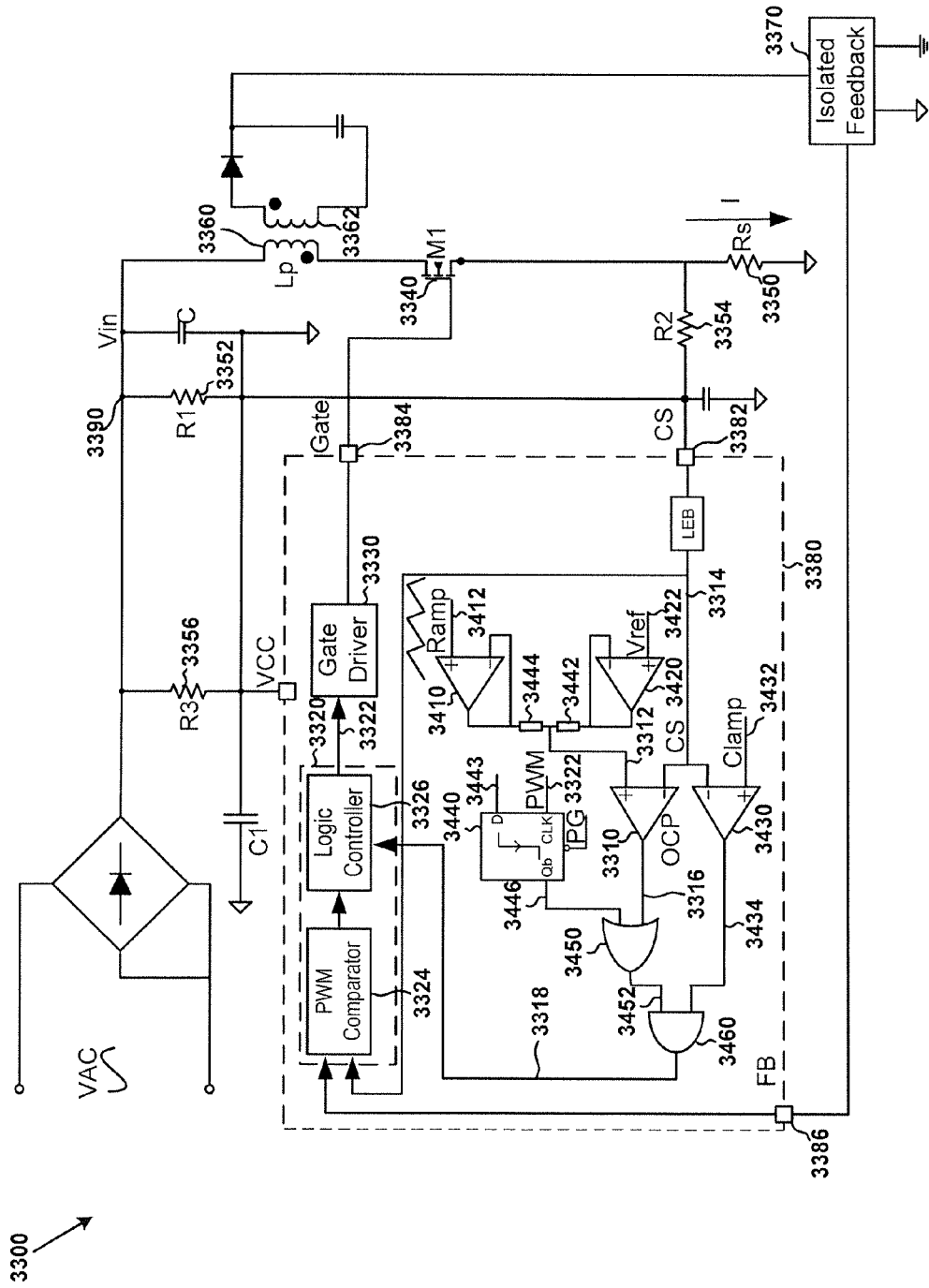
FIG. 13 is a simplified diagram showing a switch-mode converter with over-current protection based on duty cycle according to an embodiment of the present invention.

FIG. 13 is a simplified diagram showing a switch-mode converter with over-current protection based on duty cycle according to an embodiment of the present invention. This diagram is merely an example, which should not unduly limit the scope of the claims. One of ordinary skill in the art would recognize many variations, alternatives, and modifications. A switch-mode converter 3300 includes comparators 3310 and 3430, a PWM controller component 3320, a gate driver 3330, a power switch 3340, resistors 3350, 3352, 3354, and 3356, a primary winding 3360, a secondary winding 3362, and an isolated feedback component 3370. Additionally, the system 3300 includes unit-gain buffers 3410 and 3420, a flip-flop component 3440, resistors 3442 and 3444, an OR gate 3450, and an AND gate 3460. For example, the comparators 3310 and 3430, the unit-gain buffers 3410 and 3420, the PWM controller component 3320, the gate driver 3330, the flip-flop component 3440, the resistors 3442 and 3444, the OR gate 3450, and the AND gate 3460 are parts of a chip 3380 for PWM control. In another example, the PWM controller component 3320 includes a PWM comparator 3324 and a logic controller 3326. In yet another example, the chip 3380 includes terminals 3382, 3384, and 3386.

For example, the PWM controller component 3320 generates a PWM signal 3322, which is received by the gate driver 3330 and the flip-flop component 3440. In another example, the flip-flop component 3440 also receives a duty-cycle signal 3443, which is in sync with the PWM signal 3322 and has a duty cycle that is equal to a predetermined duty-cycle threshold, such as 60%. In yet another example, the flip-flop component 3440 generates a signal 3446, which is set to a NOT value of the signal 3443 at the falling edge of the PWM signal 3322.

As shown in FIG. 13, the unit-gain buffer 3410 receives a ramp signal 3412, and the unit-gain buffer 3420 receives a reference signal 3422 that represents a reference voltage. For example, based on at least the ramp signal 3412 and the reference signal 3422, the unit-gain buffers 3410 and 3420 and the resistors 3444 and 3442 together generate a signal 3312. In another example, the resistor 3444 has a resistance value that is nine times the resistance value of the resistor 3442.

According to another embodiment, the signal 3312 is received by the comparator 3310, which also receives a current-sensing signal 3314 that is received from the terminal 3382. For example, the current-sensing signal is a voltage signal (e.g., $V_{cs}$) that represents the magnitude of the current flowing through the primary winding 3360. In another example, the comparator 3310 compares the signal 3312 and the current-sensing signal 3314, and generates a signal 3316. In yet another example, the signals 3316 and 3446 are received by the OR gate 3450, which in response outputs a signal 3452 to the AND gate 3460.

In one embodiment, the current-sensing signal 3314 is received by the comparator 3430, which also receives a threshold signal 3432 that represents a threshold voltage (e.g., $V_{th\_a}$). For example, the comparator 3430 compares the signal 3432 and the signal 3314 and generates a signal 3434. In another example, both signals 3434 and 3452 are received by the AND gate 3460, which in response outputs an over-current signal 3318 to the PWM controller component 3320. In yet another example, if the over-current signal 3318 is at a logic high level, the PWM controller component 3320 uses the PWM signal 3322 to turn off the power switch 3340 and shut down the switch-mode power converter 3300.

In another embodiment, certain components of the switch-mode converter 3300 are used to implement the system 3200. For example, the signal 3212 is the PWM signal 3322. In another example, the signal 3232 is the current-sensing signal 3314. In yet another example, the signal 3234 is the over-current signal 3318.

Returning to FIG. 8 and FIG. 9, the curve 2830 or 2930 is produced if the OR gate 3450 is removed from the converter 3300 and the signal 3316 is received by the AND gate 3460 as the signal 3452 according to one embodiment. For example, the curves 2830 and 2930 each represent an effective over-current threshold. In another example, the lower limit of $V_{th\_0}$ and the upper limit of $V_{clamp}$ are predetermined voltages provided by the chip 3380 for PWM control.

Figure 14:
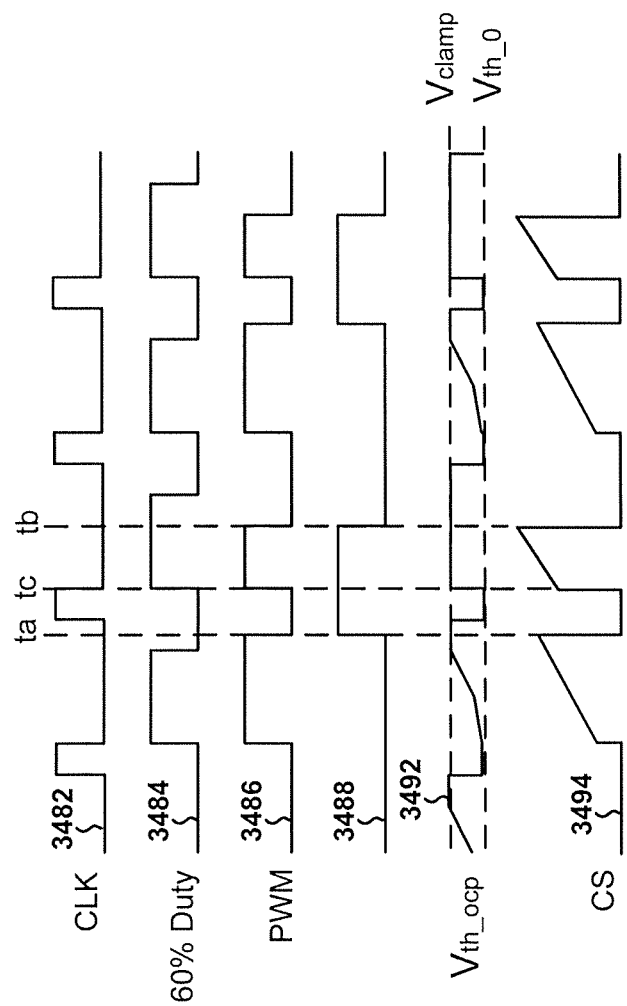
FIG. 14 shows simplified timing diagrams for the switch-mode converter according to an embodiment of the present invention.

FIG. 14 shows simplified timing diagrams for the switch-mode converter 3300 according to an embodiment of the present invention. These diagrams are merely examples, which should not unduly limit the scope of the claims. One of ordinary skill in the art would recognize many variations, alternatives, and modifications.

As shown in FIG. 14, curves 3482, 3484, 3486, and 3488 represent the timing diagrams for the clock signal, the duty-cycle signal 3443, the PWM signal 3322, and the signal 3446 respectively. For example, the duty-cycle signal 3443 has a duty cycle that is equal to a predetermined duty-cycle threshold, such as 60%. In another example, as shown by the curves 3482, 3484, and 3486, the clock signal, the duty-cycle signal 3443, and the PWM signal 3322 are in sync with each other.

According to one embodiment, if the duty cycle of the PWM signal 3322 (corresponding to the curve 3486) is larger than the duty-cycle threshold (as indicated by the curve 3484), the signal 3446 (corresponding to the curve 3488) is set to a logic high level at the falling edge of the PWM signal 3322, such as at time $t_a$. According to another embodiment, if the duty cycle of the PWM signal 3322 (corresponding to the curve 3486) is smaller than the duty-cycle threshold (as indicated by the curve 3484), the signal 3446 (corresponding to the curve 3488) is set to a logic low level at the falling edge of the PWM signal 3322, such as at time $t_b$.

As shown in FIG. 14, between the time $t_a$ and the time $t_b$, the signal 3446 (corresponding to the curve 3488) maintains at the logic high level. In one embodiment, referring to FIG. 13, if the signal 3446 is at the logic high level, the signal 3452 is also at the logic high level regardless of whether the signal 3316 is at the logic high level or at the logic low level.

As shown in FIG. 13, the signal 3452 is received by the AND gate 3460, which also receives the signal 3434 and generates the over-current signal 3318.

In one embodiment, whether the over-current signal 3318 is at the logic high level or the logic low level depends on the signal 3434, if the signal 3452 is at the logic high level such as from the time $t_a$ to the time $t_b$. In another embodiment, the effective over-current threshold at the beginning of the next PWM period, such as at time $t_c$, is set to the clamping voltage (e.g., $V_{clamp}$), if the duty cycle of the PWM signal 3322 (corresponding to the curve 3486) is larger than the duty-cycle threshold (as indicated by the curve 3484).

As shown in FIG. 14, curves 3492 and 3494 represent the timing diagrams for the effective over-current threshold and the current-sensing signal 3314 respectively. In one embodiment, if the current-sensing signal 3314 is smaller than the effective over-current threshold, the over-current signal 3318 is at the logic low level. In another embodiment, if the current-sensing signal 3314 is larger than the effective over-current threshold in magnitude, the over-current signal 3318 is at the logic high level. For example, if the over-current signal 3318 is at the logic high level, the PWM controller component 3320 uses the PWM signal 3322 to turn off the power switch 3340 and shut down the switch-mode power converter 3300. In another example, the comparison between the curve 3494 and the curve 3020 in regions B and C, the switch-mode converter 3300 can significantly improve the consistency between the maximum power actually delivered by the switch-mode converter and the predetermined maximum power as shown in FIG. 11.

Figure 15:
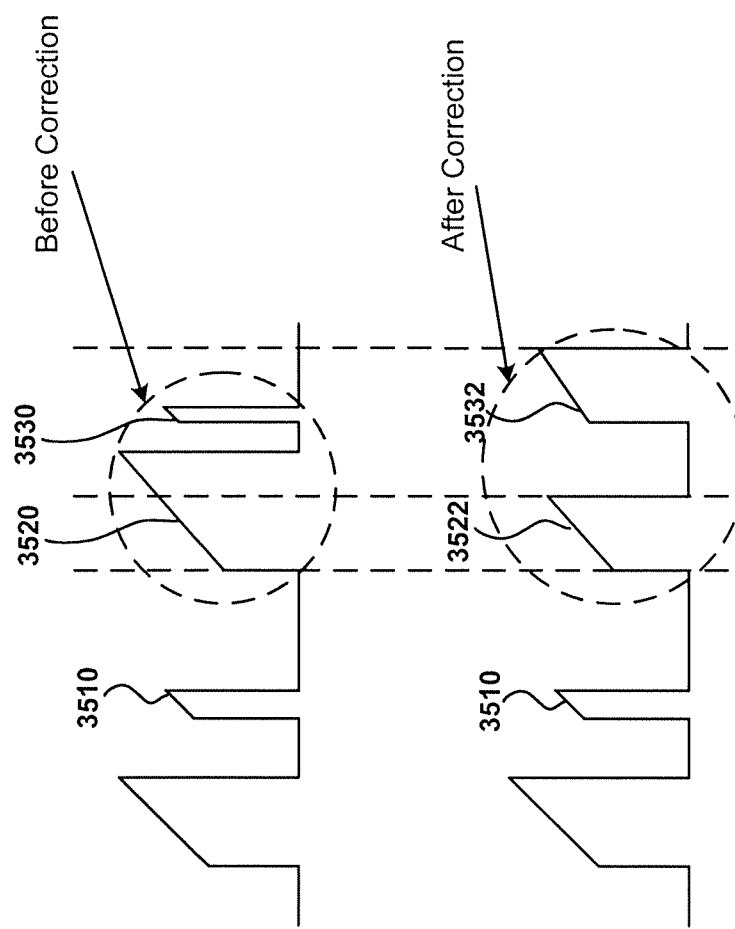
FIG. 15 is a simplified diagram showing correction to voltage pulses of the current sensing signal according to another embodiment of the present invention.

FIG. 15 is a simplified diagram showing correction to voltage pulses of the current sensing signal according to another embodiment of the present invention. This diagram is merely an example, which should not unduly limit the scope of the claims. One of ordinary skill in the art would recognize many variations, alternatives, and modifications.

As shown in FIG. 15, if the duty cycle of the PWM signal for the current PWM period (e.g., the PWM period that corresponds to a pulse 3510 in FIG. 15) is determined to be smaller than a predetermined duty-cycle threshold, such as 20%, the maximum duty cycle for the next PWM period is set to a predetermined value (e.g., 60%) in order to correct pulses 3520 and 3530 to become pulses 3522 and 3532 according to one embodiment. For example, such correction to the voltage pulse enables the primary winding of the switch-mode converter to effectively store and transfer energy. In another example, such correction to the voltage pulse can prevent the reduction of the effective switch frequency and the reduction of maximum power actually delivered by the switch-mode converter.

Figure 16:
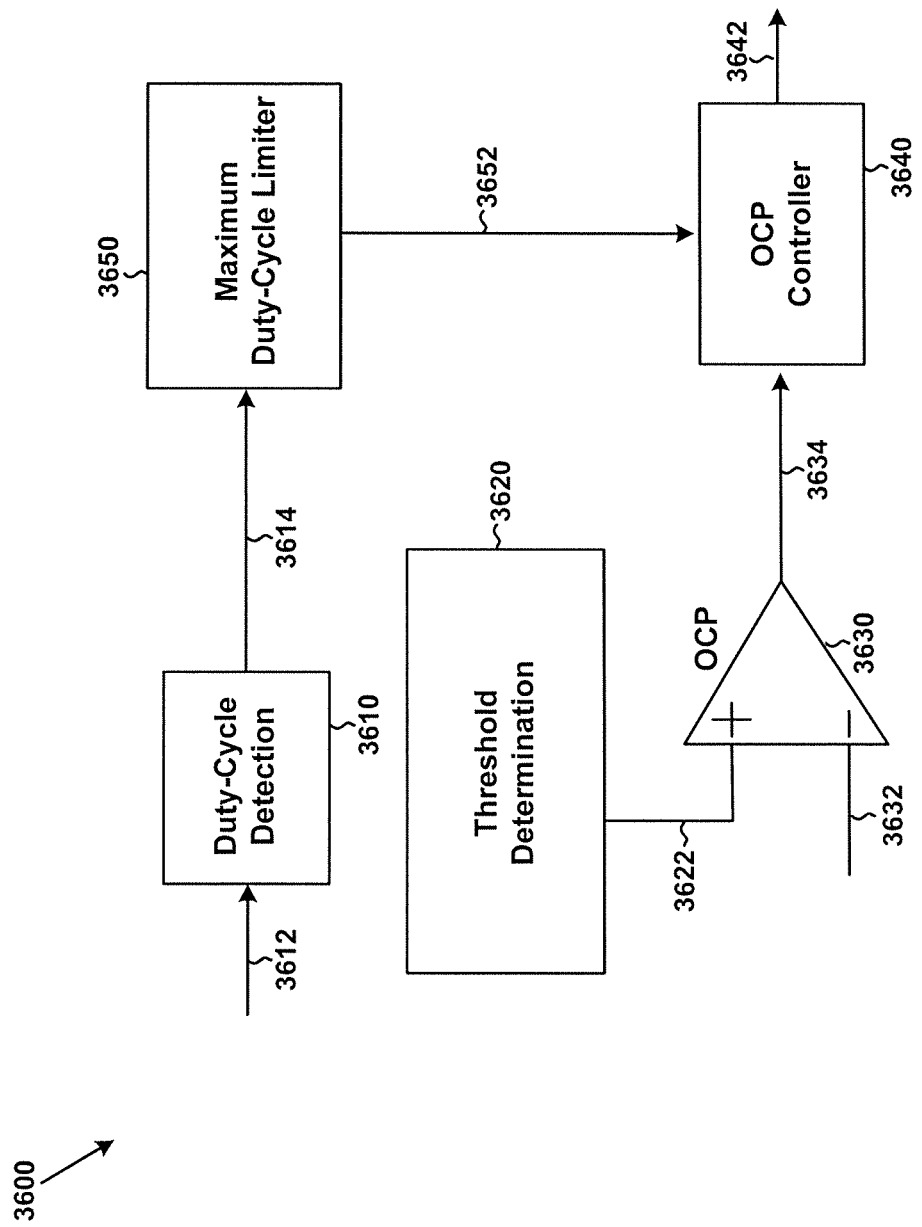
FIG. 16 is a simplified diagram showing a system for adjusting maximum duty cycle in response to detected duty cycle according to an embodiment of the present invention.

FIG. 16 is a simplified diagram showing a system for adjusting maximum duty cycle in response to detected duty cycle according to an embodiment of the present invention. This diagram is merely an example, which should not unduly limit the scope of the claims. One of ordinary skill in the art would recognize many variations, alternatives, and modifications.

As shown in FIG. 16, the system 3600 includes a duty-cycle detection component 3610, a threshold determination component 3620, a comparator component 3630, an OCP controller component 3640, and a maximum duty-cycle limiter 3650. According to one embodiment, the duty-cycle detection component 3610 receives a signal 3612 and detects the duty cycle of a signal period of the signal 3612. For example, the signal 3612 is a PWM signal. In another example, the duty-cycle detection component 3610 compares the detected duty cycle of the signal period with a predetermined duty-cycle threshold. In one embodiment, the duty-cycle threshold is, for example, 20%. In another embodiment, if the detected duty cycle is determined to be smaller than the duty-cycle threshold, the duty-cycle detection component 3610 generates a signal 3614 that indicates that the detected duty cycle of the signal period is smaller than the duty-cycle threshold.

According to another embodiment, the threshold determination component 3620 generates an over-current threshold signal 3622. For example, the over-current threshold signal 3622 ramps from a lower level (e.g., $V_{th\_0}$) to a higher level (e.g., $V_{clamp}$) within each signal period of the signal 3612. In another example, the over-current threshold signal 3622 is received by the comparator component 3630, which also receives a current-sensing signal 3632. For example, the comparator component 3630 compares the over-current threshold signal 3622 and the current-sensing signal 3632. In another example, the comparator component 3630 generates an over-current comparison signal 3634 that indicates whether the over-current threshold signal 3622 is larger than the current-sensing signal 3632 in magnitude. In yet another example, the over-current comparison signal 3634 is received by the OCP controller component 3640.

As shown in FIG. 16, the signal 3614 is generated by the duty-cycle detection component 3610 and received by the maximum duty-cycle limiter 3650. For example, if the signal 3614 indicates that the detected duty cycle of the signal period is smaller than the duty-cycle threshold, the duty-cycle limiting signal 3652 represents a maximum duty cycle for the next signal period, such as 60%. In another example, the maximum duty cycle for the next signal period as indicated by the duty-cycle limiting signal 3652 is different from another maximum duty cycle, such as 80%, that is imposed on all PWM pulses regardless the duty cycle of their previous pulses. In yet another example, the signal 3652 is received by the OCP controller 3640.

According to one embodiment, the OCP controller component 3640 receives the signals 3652 and 3634. For example, if the over-current comparison signal 3634 is at a logic high level, the OCP controller component 3640 uses the OCP control signal 3642 to shut down the switch-mode power converter. In another example, if the over-current control signal 3634 is at a logic low level and the duty-cycle limiting signal 3652 represents a maximum duty cycle for the next signal period, the OCP controller component 3640 generates the OCP control signal 3642 with a duty cycle that is smaller than or equal to the maximum duty cycle.

Figure 17:
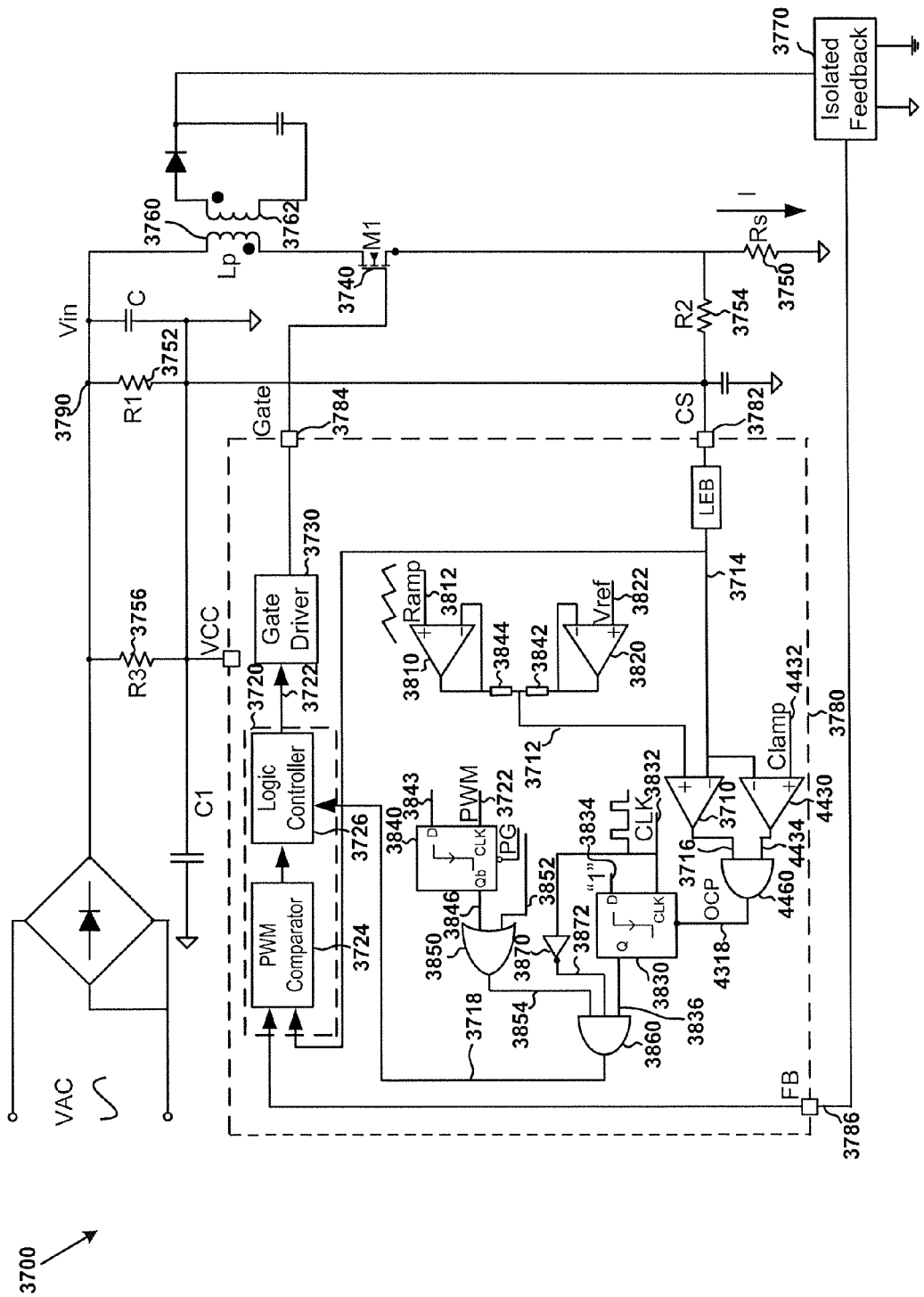
FIG. 17 is a simplified diagram showing a switch-mode converter with over-current protection based on duty cycle according to another embodiment of the present invention.

FIG. 17 is a simplified diagram showing a switch-mode converter with over-current protection based on duty cycle according to another embodiment of the present invention. This diagram is merely an example, which should not unduly limit the scope of the claims. One of ordinary skill in the art would recognize many variations, alternatives, and modifications. A switch-mode converter 3700 includes comparators 3710 and 4430, an AND gate 4460, a PWM controller component 3720, a gate driver 3730, a power switch 3740, resistors 3750, 3752, 3754 and 3756, a primary winding 3760, a secondary winding 3762, and an isolated feedback component 3770. Additionally, the system 3700 includes unit-gain buffers 3810 and 3820, flip-flop components 3830 and 3840, resistors 3842 and 3844, an OR gate 3850, an AND gate 3860, and a NOT gate 3870. For example, the comparator 3710, the unit-gain buffers 3810 and 3820, the PWM controller component 3720, the gate driver 3730, the flip-flop components 3830 and 3840, the resistors 3842 and 3844, the OR gate 3850, the AND gate

3860, and the NOT gate 3870 are parts of a chip 3780 for PWM control. In another example, the PWM controller component 3720 includes a PWM comparator 3724 and a logic controller 3726. In yet another example, the chip 3780 includes terminals 3782, 3784, and 3786.

For example, the PWM controller component 3720 generates a PWM signal 3722, which is received by the gate driver 3730 and the flip-flop component 3840. In another example, the flip-flop component 3840 also receives a duty-cycle signal 3843, which is in sync with the PWM signal 3722 and has a duty cycle that corresponds to a predetermined duty-cycle threshold. In one embodiment, the predetermined duty-cycle threshold is 20%. In another embodiment, the duty cycle of the signal 3843 is equal to one minus the predetermined duty-cycle threshold. In yet another example, the flip-flop component 3840 generates a signal 3846, which is set to a NOT value of the signal 3843 at the falling edge of the PWM signal 3722 with a slight delay.

According to one embodiment, the signal 3846 is received by the OR gate 3850, which also receives a duty-cycle signal 3852. For example, the duty-cycle signal 3852 is in sync with the PWM signal 3722 and has a duty cycle that is equal to a predetermined duty-cycle limit, such as 60%. In another example, the OR gate 3850 generates a signal 3854 based on the signals 3846 and 3852.

As shown in FIG. 17, the unit-gain buffer 3810 receives a ramp signal 3812, and the unit-gain buffer 3820 receives a reference signal 3822 that represents a reference voltage. For example, based on at least the ramp signal 3812 and the reference signal 3822, the unit-gain buffers 3810 and 3820 and the resistors 3844 and 3842 together generate a signal 3712. In another example, the resistor 3844 has a resistance value that is nine times the resistance value of the resistor 3842.

According to another embodiment, the signal 3712 is received by the comparator 3710, which also receives a current-sensing signal 3714 that is received from the terminal 3782. For example, the current-sensing signal is a voltage signal (e.g., $V_{cs}$) that represents the magnitude of the current flowing through the primary winding 3760. In another example, the comparator 3710 compares the signal 3712 and the current-sensing signal 3714, and generates a signal 3716.

In one embodiment, the current-sensing signal 3714 is also received by the comparator 4430, which also receives a threshold signal 4432 (e.g., $V_{clamp}$). For example, the comparator 4430 compares the signal 4432 and the signal 3714 and generates a signal 4434. In another example, both signals 4434 and 3716 are received by the AND gate 4460, which in response outputs an over-current signal 4318.

In another embodiment, the signal 4318 is received by the flip-flop component 3830 as a reset signal. As shown in FIG. 17, the flip-flop component 3830 also receives signals 3832 and 3834. For example, the signal 3832 is a clock signal that is in sync with the PWM signal 3722. In another example, the signal 3834 is at a logic high level. In yet another example, the flip-flop component 3830 generates a signal 3836, which is set to the value of the signal 3834 at the falling edge of the clock signal 3832. In another embodiment, the clock signal is received by the NOT gate 3870, which in response generates a signal 3872. As shown in FIG. 17, the signals 3872, 3836, and 3854 are received by the AND gate 3860, which in response outputs a signal 3718 to the PWM controller component 3720.

According to one embodiment, certain components of the switch-mode converter 3700 are used to implement the system 3600. For example, the OCP control signal 3642 is the signal 3718. In another example, the signal 3632 is the current-sensing signal 3714. In yet another example, the over-current comparison signal 3634 is the signal 4318, and the duty-cycle limiting signal 3652 is the signal 3854. In yet another example, the signal 3614 is the signal 3846, and the over-current threshold signal 3622 is the signal 3712. In yet another example, the OCP controller component 3640 includes the flip-flop component 3830, the NOT gate 3870 and the AND gate 3860.

Figure 18:
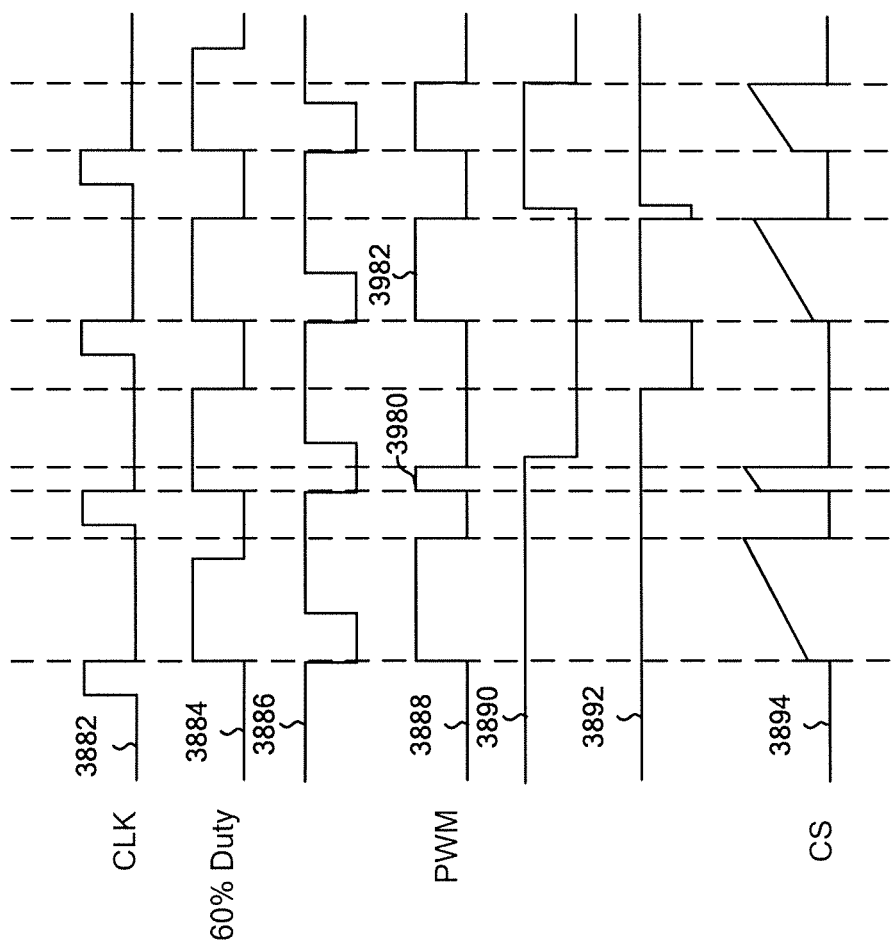
FIG. 18 shows simplified timing diagrams for the switch-mode converter according to an embodiment of the present invention.

FIG. 18 shows simplified timing diagrams for the switch-mode converter 3700 according to an embodiment of the present invention. These diagrams are merely examples, which should not unduly limit the scope of the claims. One of ordinary skill in the art would recognize many variations, alternatives, and modifications.

As shown in FIG. 18, curves 3882, 3884, 3886, and 3888 represent the timing diagrams for the clock signal 3832, the duty-cycle signal 3852, the duty-cycle signal 3843, and the signal 3718 respectively according to one embodiment. According to another embodiment, curves 3890, 3892, and 3894 represent the timing diagrams for the signal 3846, the signal 3854, and the signal 3714 respectively.

For example, the duty-cycle signal 3852 (corresponding to the curve 3884) has a duty cycle that is equal to a predetermined duty-cycle limit, such as 60%. In another example, the duty-cycle signal 3843 (corresponding to the curve 3886) has a duty cycle that corresponds to a predetermined duty-cycle threshold. In one embodiment, the predetermined duty-cycle threshold is 20%. In another embodiment, the duty cycle of the signal 3843 is equal to one minus the predetermined duty-cycle threshold. In another example, as shown by the curves 3882, 3884, 3886, and 3888, the clock signal 3832, the duty-cycle signal 3852, the duty-cycle signal 3843, and the signal 3718 are in sync with each other.

According to one embodiment, as shown by the curve 3888, the duty cycle for a pulse 3980 is smaller than the predetermined duty-cycle threshold, such as 20%. For example, the predetermined duty-cycle threshold is represented by the curve 3886, which has a duty cycle equal to one minus the predetermined duty-cycle threshold. In another example, as shown by the curve 3890, the signal 3846 changes from a logic high level to a logic low level at the falling edge of the pulse 3980 with a slight delay. In yet another example, if the signal 3846 (corresponding to the curve 3890) is at the logic low level, the signal 3854 (corresponding to the curve 3892) is the same as the signal 3852 (corresponding to the curve 3884). As shown by the curve 3888, the duty cycle for a pulse 3982 is limited to the duty cycle of the signal 3852 (corresponding to the curve 3884) through the signal 3854 (corresponding to the curve 3892). For example, the duty cycle for the pulse 3982 is limited to 60%. In another example, the demagnetization process for the signal period corresponding to the pulse 3982 is sufficiently implemented.

Figure 19:
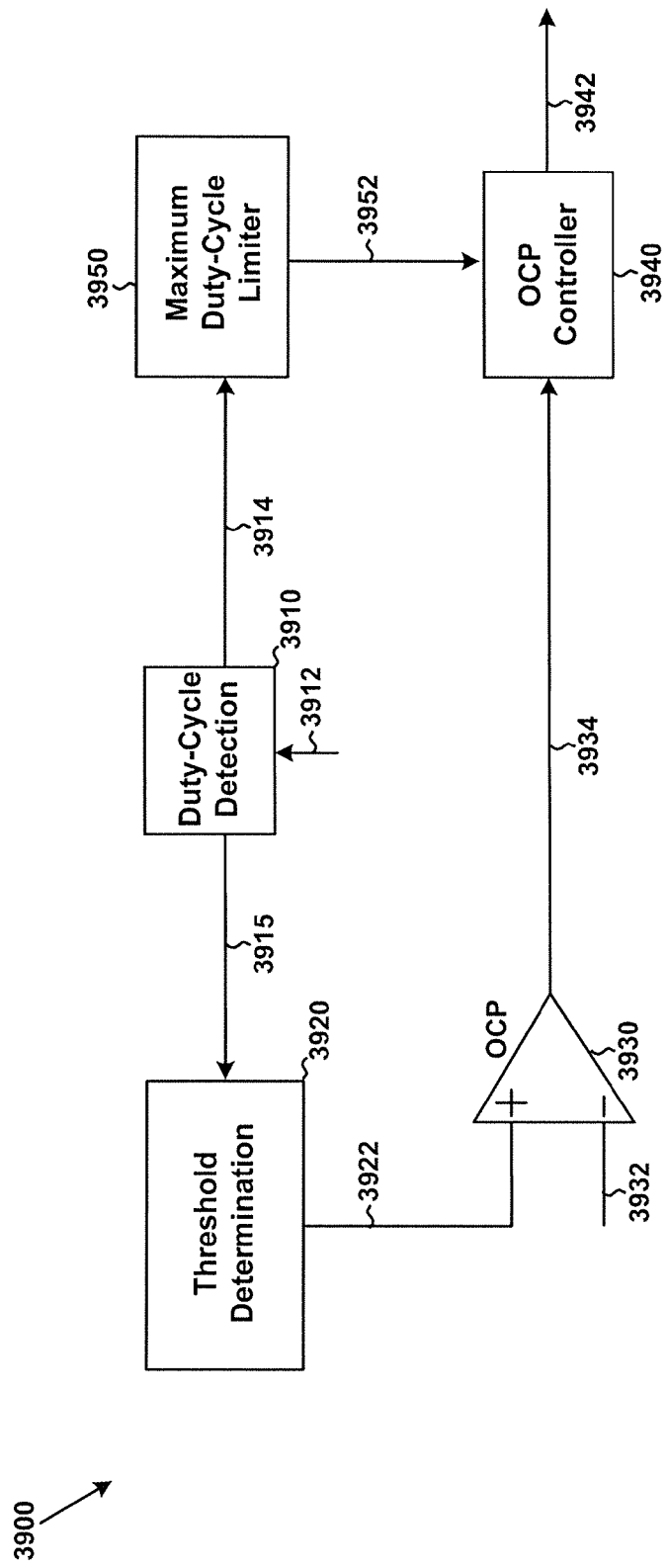
FIG. 19 is a simplified diagram showing a system for adjusting over-current threshold and/or maximum duty cycle in response to detected duty cycle according to an embodiment of the present invention.

FIG. 19 is a simplified diagram showing a system for adjusting over-current threshold and/or maximum duty cycle in response to detected duty cycle according to an embodiment of the present invention. This diagram is merely an example, which should not unduly limit the scope of the claims. One of ordinary skill in the art would recognize many variations, alternatives, and modifications. As shown in FIG. 19, the system 3900 includes a duty-cycle detection component 3910, a threshold determination component 3920, a comparator 3930, an OCP controller component 3940, and a maximum duty-cycle limiter 3950.

According to one embodiment, the duty-cycle detection component 3910 receives a signal 3912 and detects the duty cycle of a signal period of the signal 3912. For example, the signal 3912 is a PWM signal. In one embodiment, the duty-cycle detection component 3910 compares the detected duty cycle of the signal period with a predetermined lower duty-cycle threshold. For example, the lower duty-cycle threshold is 20%. In another example, if the detected duty cycle is determined to be smaller than the lower duty-cycle threshold, the duty-cycle detection component 3910 generates a signal 3914 that indicates that the detected duty cycle of the signal period is smaller than the lower duty-cycle threshold.

In another embodiment, the duty-cycle detection component 3910 compares the detected duty cycle of the signal period with a predetermined higher duty-cycle threshold. For example, the higher duty-cycle threshold is 60%. In another example, the duty-cycle detection component 3910 generates a signal 3915 that indicates whether the detected duty cycle of the signal period is larger than the higher duty-cycle threshold.

According to one embodiment, the signal 3915 is received by the threshold determination component 3920, which generates an over-current threshold signal 3922. For example, if the signal 3915 does not indicate that the detected duty cycle of the signal period is larger than the higher duty-cycle threshold, the over-current threshold signal 3922 is ramped from a lower level (e.g., $V_{th\_0}$) to a higher level (e.g., $V_{clamp}$) during the next signal period. In another example, if the signal 3915 indicates that the detected duty cycle of the signal period is larger than the duty-cycle threshold, the over-current threshold signal 3922 is set to another threshold level (e.g., $V_{th\_a}$) that is different from the lower level (e.g., $V_{th\_0}$) at the beginning of the next signal period. In one embodiment, the threshold level (e.g., $V_{th\_a}$) is equal to the higher level (e.g., $V_{clamp}$), and the over-current threshold signal 3922 stays constant during the signal period. In another embodiment, the threshold level (e.g., $V_{th\_a}$) is larger than the lower level (e.g., $V_{th\_0}$) but smaller than the higher level (e.g., $V_{clamp}$), and the over-current threshold signal 3922 is ramped from the threshold level (e.g., $V_{th\_a}$) to the higher level (e.g., $V_{clamp}$) during the signal period.

According to another embodiment, the over-current threshold signal 3922 is received by the comparator 3930, which also receives a current-sensing signal 3932. For example, the comparator 3930 compares the over-current threshold signal 3922 and the current-sensing signal 3932. In another example, the comparator 3930 generates an over-current comparison signal 3934 that indicates whether the over-current threshold signal 3922 is larger than the current-sensing signal 3932 in magnitude. In yet another example, the over-current comparison signal 3934 is received by the OCP controller component 3940.

As shown in FIG. 19, the signal 3914 is generated by the duty-cycle detection component 3910 and received by the maximum duty-cycle limiter 3950. For example, if the signal 3914 indicates that the detected duty cycle of the signal period is smaller than the lower duty-cycle threshold, the maximum duty-cycle limiter 3950 generates the duty-cycle limiting signal 3952 that represents a maximum duty cycle for the next signal period, such as 60%. In another example, the maximum duty cycle for the next signal period as indicated by the duty-cycle limiting signal 3952 is different from another maximum duty cycle, such as 80%, that is imposed on all PWM pulses regardless the duty cycle of their previous pulses. In yet another example, the signal 3952 is received by the OCP controller component 3940.

In one embodiment, the OCP controller component 3940 receives the signal 3952 and/or the signal 3934, and generates an OCP control signal 3942. For example, if the over-current comparison signal 3934 is at a logic high level, the OCP controller component 3940 uses the OCP controller signal 3942 to shut down the switch-mode power converter. In another example, if the over-current control signal 3934 is at a logic low level and the duty-cycle limiting signal 3952 represents a maximum duty cycle for the next signal period, the OCP controller component 3940 generates the OCP control signal 3942 with a duty cycle that is smaller than or equal to the maximum duty cycle (e.g., 60%).

Figure 20:
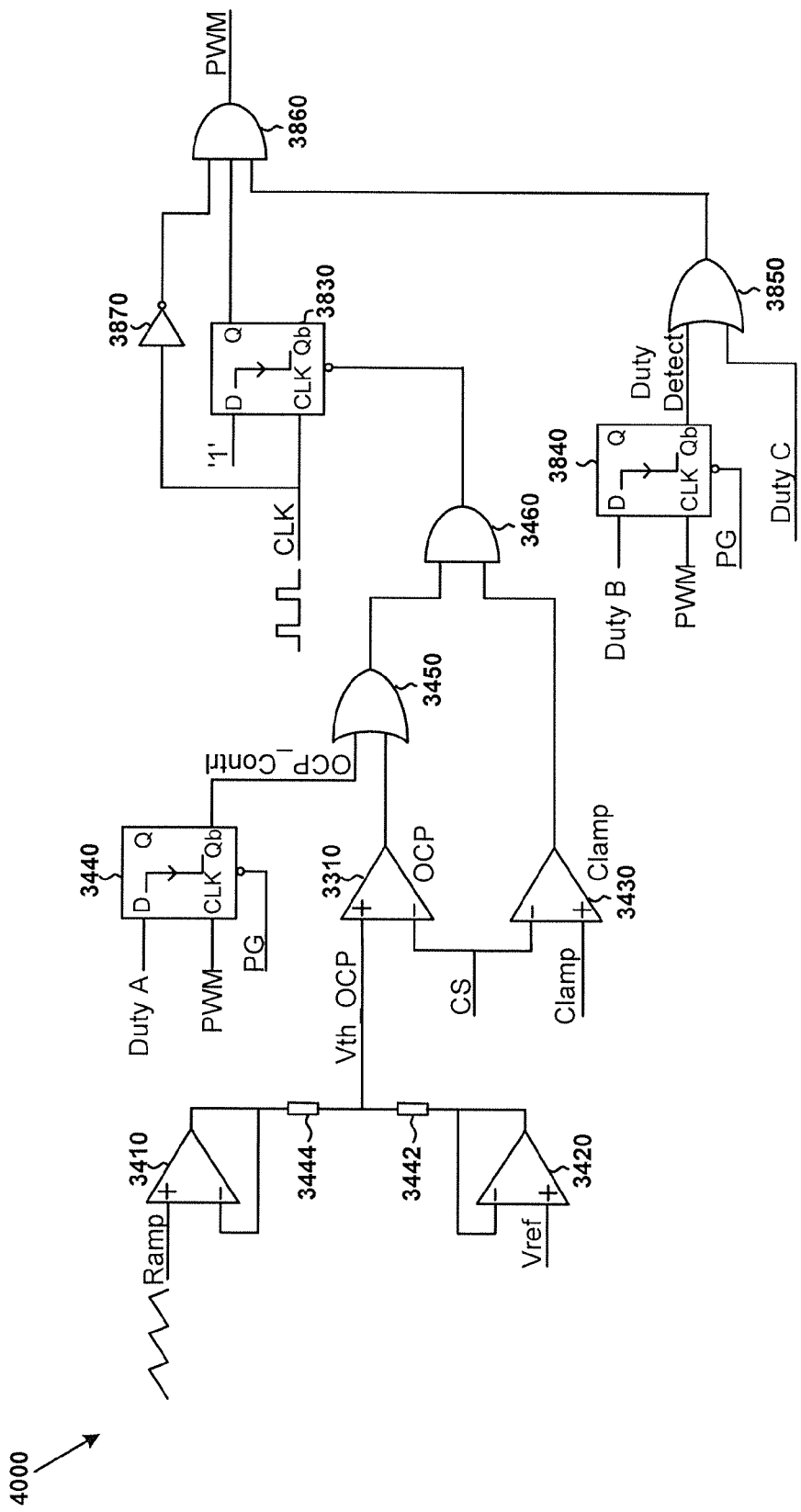
FIG. 20 is a simplified diagram showing a system for adjusting over-current threshold and/or maximum duty cycle in response to detected duty cycle according to another embodiment of the present invention.

FIG. 20 is a simplified diagram showing a system for adjusting over-current threshold and/or maximum duty cycle in response to detected duty cycle according to another embodiment of the present invention. This diagram is merely an example, which should not unduly limit the scope of the claims. One of ordinary skill in the art would recognize many variations, alternatives, and modifications.

According to one embodiment, the system 4000 includes the comparators 3310 and 3430, the unit-gain buffers 3410 and 3420, the flip-flop components 3440, 3830 and 3840, the resistors 3444 and 3442, the OR gates 3450 and 3850, the AND gates 3460 and 3860, and the NOT gate 3870. According to another embodiment, the system 4000 is used to implement the system 3900. For example, the system 3900 is a combination of the systems 3200 and 3600. In another example, the system 4000 is a combination of certain components of the systems 3300 and 3700.

According to one embodiment, a system for protecting a power converter includes a duty-cycle detection component configured to receive a modulation signal, determine a first duty cycle corresponding to a first period of the modulation signal, compare the first duty cycle with a threshold duty cycle, and generate a duty-cycle comparison signal. Additionally, the system includes a threshold generator configured to receive the duty-cycle comparison signal and generate a threshold signal corresponding to a second period of the modulation signal, the second period being after the first period, and a comparator component configured to receive the threshold signal and a first signal and to generate a first comparison signal. The first signal is associated with an input current for a power converter. Moreover, the system includes a pulse-width-modulation component configured to receive the first comparison signal and generate the modulation signal for adjusting the input current for the power converter based on at least information associated with the first comparison signal. The threshold signal is associated with a threshold magnitude corresponding to the second period of the modulation signal. If the first duty cycle is determined to be smaller than the threshold duty cycle, the threshold magnitude equals a first magnitude at the beginning of the second period and changes from the first magnitude to a second magnitude within the second period. If the first duty cycle is determined to be larger than the threshold duty cycle, the threshold magnitude equals a third magnitude at the beginning of the second period, and the third magnitude is larger than the first magnitude. For example, the system is implemented according to FIG. 12 and/or FIG. 13.

According to another embodiment, a method for protecting a power converter includes receiving a modulation signal, determining a first duty cycle corresponding to a first period of the modulation signal, processing information associated with the first duty cycle and a threshold duty cycle, and generating a duty-cycle comparison signal to indicate whether the first duty cycle is larger than the threshold duty cycle or whether the first duty cycle is smaller than the threshold duty cycle. Additionally, the method includes receiving the duty-cycle comparison signal, processing information associated with the duty-cycle comparison signal, and generating a threshold signal corresponding to a second period of the modulation signal. The second period is after the first period. Moreover, the method includes receiving the threshold signal and a first signal. The first signal is associated with an input current for a power converter. Also, the method includes generating a first comparison signal based on at least information associated with the threshold signal and the first signal, receiving the first comparison signal, processing information associated with the first comparison signal, and generating the modulation signal for adjusting the input current for the power converter based on at least information associated with the first comparison signal. The threshold signal is associated with a threshold magnitude corresponding to the second period of the modulation signal. If the first duty cycle is smaller than the threshold duty cycle, the threshold magnitude equals a first magnitude at the beginning of the second period and changes from the first magnitude to a second magnitude within the second period. If the first duty cycle is larger than the threshold duty cycle, the threshold magnitude equals the third magnitude at the beginning of the second period, and the third magnitude is larger than the first magnitude. For example, the method is implemented according to FIG. 12 and/or FIG. 13.

According to yet another embodiment, a system for protecting a power converter includes a duty-cycle detection component configured to receive a modulation signal, determine a first duty cycle corresponding to a first period of the modulation signal, compare the first duty cycle with a threshold duty cycle, and generate a duty-cycle comparison signal. Additionally, the system includes a threshold generator configured to generate a threshold signal, and a comparator configured to receive the threshold signal and a first signal and generate a first comparison signal. The first signal is associated with an input current for a power converter. Moreover, the system includes a duty-cycle limiting component configured to receive the duty-cycle comparison signal and generate a duty-cycle limiting signal based on at least information associated with the duty-cycle comparison signal, and a control and modulation component configured to receive the first comparison signal and the duty-cycle limiting signal and generate the modulation signal for a second period. The second period is after the first period. The modulation signal for the second period is associated with a second duty cycle, and the duty-cycle limiting signal is associated with a duty-cycle limiting value. If the first duty cycle is smaller than the threshold duty cycle; the second duty cycle cannot exceed the duty-cycle limiting value, and if the first duty cycle is larger than the threshold duty cycle, the second duty cycle can exceed the duty-cycle limiting value. For example, the system is implemented according to FIG. 16 and/or FIG. 17.

According to yet another embodiment, a method for protecting a power converter includes receiving a modulation signal, determining a first duty cycle corresponding to a first period of the modulation signal, processing information associated with the first duty cycle with a threshold duty cycle, and generating a duty-cycle comparison signal to indicate whether the first duty cycle is larger than the threshold duty cycle or whether the first duty cycle is smaller than the threshold duty cycle. Additionally, the method includes receiving the duty-cycle comparison signal, processing information associated with the duty-cycle comparison signal, generating a duty-cycle limiting signal based on at least information associated with the duty-cycle comparison signal, generating a threshold signal, and receiving the threshold signal and a first signal. The first signal is associated with an input current for a power converter. Moreover, the method includes generating a first comparison signal based on at least information associated with the threshold signal and the first signal, receiving the first comparison signal and the duty-cycle limiting signal, processing information associated with the first comparison signal and the duty-cycle limiting signal, and generating the modulation signal for a second period based on at least information associated with the first comparison signal and the duty-cycle limiting signal. The second period is after the first period. The modulation signal for the second period is associated with a second duty cycle, and the duty-cycle limiting signal is associated with a duty-cycle limiting value. If the first duty cycle is smaller than the threshold duty cycle, the second duty cycle cannot exceed the duty-cycle limiting value, and if the first duty cycle is larger than the threshold duty cycle, the second duty cycle can exceed the duty-cycle limiting value. For example, the method is implemented according to FIG. 16 and/or FIG. 17.

According to yet another embodiment, a system for protecting a power converter includes a duty-cycle detection component configured to receive a modulation signal, determine a first duty cycle corresponding to a first period of the modulation signal, compare the first duty cycle with a first threshold duty cycle, compare the first duty cycle with a second threshold duty cycle, and generate a first duty-cycle comparison signal and a second duty-cycle comparison signal. Additionally, the system includes a threshold generator configured to receive the first duty-cycle comparison signal and generate a threshold signal corresponding to a second period of the modulation signal, and a comparator component configured to receive the threshold signal and a first signal and generate a first comparison signal. The second period is after the first period, and the first signal is associated with an input current for a power converter. Moreover, the system includes a duty-cycle limiting component configured to receive the second duty-cycle comparison signal and generate a duty-cycle limiting signal based on at least information associated with the second duty-cycle comparison signal, and a control and modulation component configured to receive the first comparison signal and the duty-cycle limiting signal and generate the modulation signal for the second period. The threshold signal is associated with a threshold magnitude corresponding to the second period of the modulation signal. If the first duty cycle is determined to be smaller than the first threshold duty cycle, the threshold magnitude equals a first magnitude at the beginning of the second period and changes from the first magnitude to a second magnitude within the second period, and if the first duty cycle is determined to be larger than the first threshold duty cycle, the threshold magnitude equals a third magnitude at the beginning of the second period, the third magnitude being larger than the first magnitude. The modulation signal for the second period is associated with a second duty cycle, and the duty-cycle limiting signal is associated with a duty-cycle limiting value. If the first duty cycle is smaller than the second threshold duty cycle; the second duty cycle cannot exceed the duty-cycle limiting value, and if the first duty cycle is larger than the second threshold duty cycle, the second duty cycle can exceed the duty-cycle limiting value. For example, the system is implemented according to FIG. 19 and/or FIG. 20.

According to yet another embodiment, a method for protecting a power converter includes receiving a modulation signal, determining a first duty cycle corresponding to a first period of the modulation signal, processing information associated with the first duty cycle with a first threshold duty cycle and a second threshold duty cycle, generating a first duty-cycle comparison signal to indicate whether the first duty cycle is larger than the first threshold duty cycle or whether the first duty cycle is smaller than the first threshold duty cycle, and generating a second duty-cycle comparison signal to indicate whether the first duty cycle is larger than the second threshold duty cycle or whether the first duty cycle is smaller than the second threshold duty cycle. Additionally, the method includes receiving the first duty-cycle comparison signal, processing information associated with the first duty-cycle comparison signal, and generating a threshold signal corresponding to a second period of the modulation signal, and receiving the threshold signal and a first signal. The second period is after the first period, and the first signal is associated with an input current for a power converter. Moreover, the method includes generating a first comparison signal based on at least information associated with the threshold signal and the first signal, receiving the second duty-cycle comparison signal, processing information associated with the second duty-cycle comparison signal, and generating a duty-cycle limiting signal based on at least information associated with the second duty-cycle comparison signal. Also, the method includes receiving the first comparison signal and the duty-cycle limiting signal, processing information associated with the first comparison signal and the duty-cycle limiting signal, and generating the modulation signal for the second period based on at least information associated with the first comparison signal and the duty-cycle limiting signal. The threshold signal is associated with a threshold magnitude corresponding to the second period of the modulation signal. If the first duty cycle is determined to be smaller than the first threshold duty cycle, the threshold magnitude equals a first magnitude at the beginning of the second period and changes from the first magnitude to a second magnitude within the second period, and if the first duty cycle is determined to be larger than the first threshold duty cycle, the threshold magnitude equals a third magnitude at the beginning of the second period, the third magnitude being larger than the first magnitude. The modulation signal for the second period is associated with a second duty cycle, and the duty-cycle limiting signal is associated with a duty-cycle limiting value. If the first duty cycle is smaller than the second threshold duty cycle; the second duty cycle cannot exceed the duty-cycle limiting value, and if the first duty cycle is larger than the second threshold duty cycle, the second duty cycle can exceed the duty-cycle limiting value. For example, the method is implemented according to FIG. 19 and/or FIG. 20.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for protecting a power converter, the system comprising:
  a duty-cycle detector configured to receive a modulation signal, determine a first duty cycle corresponding to a first period of the modulation signal, compare the first duty cycle with a threshold duty cycle, and generate a duty-cycle comparison signal;
  a threshold generator configured to receive the duty-cycle comparison signal and generate a threshold signal corresponding to a second period of the modulation signal, the second period being after the first period; and
  a pulse-width-modulation controller configured to generate the modulation signal for adjusting an input current for a power converter based on at least information associated with the threshold signal;
  wherein the threshold signal is associated with a threshold magnitude corresponding to the second period of the modulation signal;
  wherein the threshold generator is further configured to:
    in response to the first duty cycle being determined to be smaller than the threshold duty cycle, set the threshold magnitude to be equal to a first magnitude at the beginning of the second period and change the threshold magnitude from the first magnitude to a second magnitude during the second period; and
    in response to the first duty cycle being determined to be larger than the threshold duty cycle, set the threshold magnitude to be equal to a third magnitude at the beginning of the second period, the third magnitude being larger than the first magnitude.

2. The system of claim 1 wherein the threshold duty cycle is predetermined to be equal to 60%.

3. The system of claim 1 wherein the second period is immediately after the first period.

4. The system of claim 1 wherein the threshold generator is further configured to, in response to the first duty cycle being determined to be larger than the threshold duty cycle, change the threshold magnitude from the third magnitude to the second magnitude during the second period, the third magnitude being different from the second magnitude.

5. The system of claim 1 wherein the threshold generator is further configured to, in response to the first duty cycle being determined to be larger than the threshold duty cycle, setting the threshold magnitude to be equal to the third magnitude throughout the entire second period, the third magnitude being equal to the second magnitude.

6. The system of claim 1 wherein:
  the power converter includes an inductive winding; and
  the input current flows through the inductive winding.

7. The system of claim 1, and further comprising a first resistor configured to convert the input current for the power converter to a first voltage.

8. The system of claim 7 wherein the threshold signal represents a threshold voltage.

9. The system of claim 1, and further comprising a switch coupled to the pulse-width-modulation controller and configured to adjust the input current for the power converter based on at least information associated with the modulation signal.

10. The system of claim 9 wherein the switch is coupled to the pulse-width-modulation controller indirectly through a gate driver.

11. The system of claim 10 wherein the pulse-width-modulation controller comprises a pulse-width-modulation comparator and a logic controller.

12. The system of claim 11 wherein:
  the logic controller is configured to generate the modulation signal based on at least information associated with the threshold signal; and the gate driver is configured to receive the modulation signal and generate a drive signal, the drive signal being received by the switch.

13. The system of claim 12 wherein the drive signal turns off the switch in response to a first amplitude for a first signal being larger than the threshold magnitude, the first signal being associated with the input current.

14. A method for protecting a power converter, the method comprising:
receiving a modulation signal;
determining a first duty cycle corresponding to a first period of the modulation signal;
generating a duty-cycle comparison signal to indicate whether the first duty cycle is larger than a threshold duty cycle or whether the first duty cycle is smaller than the threshold duty cycle;
receiving the duty-cycle comparison signal;
generating a threshold signal corresponding to a second period of the modulation signal based at least in part on the duty-cycle comparison signal, the second period being after the first period;
processing information associated with the threshold signal; and
generating the modulation signal for adjusting an input current for a power converter based on at least information associated with the threshold signal;
wherein the threshold signal is associated with a threshold magnitude corresponding to the second period of the modulation signal;
wherein the generating a threshold signal corresponding to a second period of the modulation signal includes:
in response to the first duty cycle being smaller than the threshold duty cycle, setting the threshold magnitude to be equal to a first magnitude at the beginning of the second period and changing the threshold magnitude from the first magnitude to a second magnitude during the second period; and
in response to the first duty cycle being larger than the threshold duty cycle, setting the threshold magnitude to be equal to the third magnitude at the beginning of the second period, the third magnitude being larger than the first magnitude.

15. The method of claim 14 wherein the second period is immediately after the first period.

16. The method of claim 14 wherein the generating a threshold signal corresponding to a second period of the modulation signal further includes, in response to the first duty cycle being determined to be larger than the threshold duty cycle, changing the threshold magnitude from the third magnitude to the second magnitude during the second period, the third magnitude being different from the second magnitude.

17. The system of claim 14 wherein, in response to the first duty cycle being determined to be larger than the threshold duty cycle, setting the threshold magnitude to be equal to the third magnitude throughout the entire second period, the third magnitude being equal to the second magnitude.

18. The system of claim 14 wherein the threshold signal represents a threshold voltage.

19. A system for protecting a power converter, the system comprising:
a duty-cycle detector configured to receive a modulation signal, determine a first duty cycle corresponding to a first period of the modulation signal, compare the first duty cycle with a threshold duty cycle, and generate a duty-cycle comparison signal;
a duty-cycle limiter configured to receive the duty-cycle comparison signal and generate a duty-cycle limiting signal based at least in part on the duty-cycle comparison signal; and
a protection and modulation controller configured to receive the duty-cycle limiting signal and generate the modulation signal for a second period based at least in part on the duty-cycle limiting signal, the second period being after the first period;
wherein:
the modulation signal for the second period is associated with a second duty cycle; and
the duty-cycle limiting signal is associated with a duty-cycle limiting value;
wherein the protection and modulation controller is further configured to:
in response to the first duty cycle being smaller than the threshold duty cycle, not allow the second duty cycle to exceed the duty-cycle limiting value; and
in response to the first duty cycle being larger than the threshold duty cycle, allow the second duty cycle to exceed the duty-cycle limiting value.

20. The system of claim 19 wherein the duty-cycle limiting value is larger than the threshold duty cycle.

21. The system of claim 20 wherein the threshold duty cycle is predetermined to be equal to 20%.

22. The system of claim 21 wherein the duty-cycle limiting value is predetermined to be equal to 60%.

23. The system of claim 19 wherein the second period is immediately after the first period.

24. The system of claim 19, and further comprising a switch coupled to the protection and modulation controller and configured to adjust an input current for a power converter based on at least information associated with the modulation signal.

25. The system of claim 24 wherein the switch is coupled to the protection and modulation controller indirectly through a gate driver.

26. The system of claim 25 wherein:
the protection and modulation controller includes an over-current protection controller and a pulse-width-modulation controller; and
the pulse-width-modulation controller includes a pulse-width-modulation comparator and a logic controller.

27. The system of claim 26 wherein:
the over-current protection controller is configured to receive the duty-cycle limiting signal and generate a first signal based at least in part on the duty-cycle limiting signal;
the logic controller is configured to receive the first signal and generate the modulation signal based at least in part on the first signal; and
the gate driver is configured to receive the modulation signal and output a drive signal to the switch.

28. The system of claim 27 wherein:
the over-current protection controller is further configured to receive a second signal and generate the first signal based at least in part on the second signal and the duty-cycle limiting signal.

29. A method for protecting a power converter, the method comprising:
receiving a modulation signal;
determining a first duty cycle corresponding to a first period of the modulation signal;

generating a duty-cycle comparison signal to indicate whether the first duty cycle is larger than the threshold duty cycle or whether the first duty cycle is smaller than the threshold duty cycle;

receiving the duty-cycle comparison signal;

generating a duty-cycle limiting signal based at least in part on the duty-cycle comparison signal;

receiving the duty-cycle limiting signal; and generating the modulation signal for a second period based at least in part on the duty-cycle limiting signal, the second period being after the first period;

wherein:
the modulation signal for the second period is associated with a second duty cycle; and
the duty-cycle limiting signal is associated with a duty-cycle limiting value;

wherein the generating the modulation signal for a second period includes:
in response to the first duty cycle being smaller than the threshold duty cycle, not allowing the second duty cycle to exceed the duty-cycle limiting value; and
in response to the first duty cycle being larger than the threshold duty cycle, allowing the second duty cycle to exceed the duty-cycle limiting value.

30. The method of claim 29 wherein the duty-cycle limiting value is larger than the threshold duty cycle.

31. The method of claim 29 wherein the second period is immediately after the first period.

32. A system for protecting a power converter, the system comprising:
a duty-cycle detector configured to receive a modulation signal, determine a first signal duty cycle corresponding to a first period of the modulation signal, compare the first signal duty cycle with a first threshold duty cycle, compare the first signal duty cycle with a second threshold duty cycle, and generate a first duty-cycle comparison signal and a second duty-cycle comparison signal;
a threshold generator configured to receive the first duty-cycle comparison signal and generate a threshold signal corresponding to a second period of the modulation signal, the second period being after the first period;
a duty-cycle limiter configured to receive the second duty-cycle comparison signal and generate a duty-cycle limiting signal based at least in part on the second duty-cycle comparison signal; and
a protection and modulation controller configured to generate the modulation signal for the second period based on at least information associated with the threshold signal and the duty-cycle limiting signal;

wherein:
the threshold signal is associated with a threshold magnitude corresponding to the second period of the modulation signal;
the modulation signal for the second period is associated with a second signal duty cycle; and
the duty-cycle limiting signal is associated with a duty-cycle limiting value;

wherein the threshold generator is further configured to:
in response to the first signal duty cycle being determined to be smaller than the first threshold duty cycle, set the threshold magnitude to be equal to a first magnitude at the beginning of the second period and change the threshold magnitude from the first magnitude to a second magnitude during the second period; and in response to the first signal duty cycle being determined to be larger than the first threshold duty cycle, set the threshold magnitude to be equal to a third magnitude at the beginning of the second period, the third magnitude being larger than the first magnitude;

wherein the protection and modulation controller is further configured to, in response to the threshold signal being larger than a first signal associated with an input current for a power converter:
in response to the first signal duty cycle being smaller than the second threshold duty cycle, not allow the second signal duty cycle to exceed the duty-cycle limiting value; and
in response to the first signal duty cycle being larger than the second threshold duty cycle, allow the second signal duty cycle to exceed the duty-cycle limiting value.

33. The system of claim 32 wherein the protection and modulation controller is further configured to, in response to the threshold signal being smaller than the first signal, generate the modulation signal to shut down the power converter.

34. A method for protecting a power converter, the method comprising:
receiving a modulation signal;
determining a first signal duty cycle corresponding to a first period of the modulation signal;
generating a first duty-cycle comparison signal to indicate whether the first signal duty cycle is larger than a first threshold duty cycle or whether the first signal duty cycle is smaller than the first threshold duty cycle;
generating a second duty-cycle comparison signal to indicate whether the first signal duty cycle is larger than a second threshold duty cycle or whether the first signal duty cycle is smaller than the second threshold duty cycle;
receiving the first duty-cycle comparison signal;
generating a threshold signal corresponding to a second period of the modulation signal based at least in part on the first duty-cycle comparison signal, the second period being after the first period;
receiving the second duty-cycle comparison signal;
generating a duty-cycle limiting signal based at least in part on the second duty-cycle comparison signal;
receiving the duty-cycle limiting signal; and
generating the modulation signal for the second period based on at least information associated with the threshold signal and the duty-cycle limiting signal;

wherein:
the threshold signal is associated with a threshold magnitude corresponding to the second period of the modulation signal;
the modulation signal for the second period is associated with a second signal duty cycle; and
the duty-cycle limiting signal is associated with a duty-cycle limiting value;

wherein the generating a threshold signal corresponding to a second period of the modulation signal includes:
in response to the first signal duty cycle being determined to be smaller than the first threshold duty cycle, setting the threshold magnitude to be equal to a first magnitude at the beginning of the second period and changing the threshold magnitude from the first magnitude to a second magnitude during the second period; and in response to the first signal duty cycle being determined to be larger than the first threshold duty cycle, setting the threshold magnitude to be equal to a third magnitude at the beginning of the second period, the third magnitude being larger than the first magnitude;

wherein the generating the modulation signal for the second period includes, in response to the threshold signal being larger than a first signal associated with an input current for a power converter:

in response to the first signal duty cycle being smaller than the second threshold duty cycle, not allowing the second signal duty cycle to exceed the duty-cycle limiting value; and in response to the first signal duty cycle being larger than the second threshold duty cycle, allowing the second signal duty cycle to exceed the duty-cycle limiting value.

35. The method of claim 34, and further comprising:

in response to the threshold signal being smaller than the first signal, generating the modulation signal to shut down the power converter.

\* \* \* \* \*